US012562578B2

(12) United States Patent
   Elfouly et al.

(10) Patent No.: US 12,562,578 B2
(45) Date of Patent: Feb. 24, 2026

(54) UNIVERSAL CONTROL UNIT FOR PV FED SINGLE STAGE INVERTERS

(71) Applicant: Khalifa University of Science and Technology, Abu Dhabi (AE)

(72) Inventors: Tarek Hussein Mostafa Elfouly, Abu Dhabi (AE); Ahmed Abad Daifalla Saleh Aldurra, Abu Dhabi (AE); Hatem Hussein Magdy Mohamed Zeineldin, Abu Dhabi (AE); Mohamed Mohamed Zakaria Moustafa, Alexandria (EG); Mohamed Ahmed Abdelrazek Mahmoud Aboushal, Alexandria (EG)

(73) Assignee: Khalifa University of Science and Technology, Abu Dhabi (AE)

( * ) Notice: Subject to any disclaimer, the term of this patent is extended or adjusted under 35 U.S.C. 154(b) by 385 days.

(21) Appl. No.: 18/188,346

(22) Filed: Mar. 22, 2023

(65) Prior Publication Data

US 2023/0318306 A1     Oct. 5, 2023

Related U.S. Application Data

(60) Provisional application No. 63/326,531, filed on Apr. 1, 2022.

(51) Int. Cl.
   *H02J 3/38* (2006.01)
   *H02J 3/08* (2006.01)
   *H02J 3/388* (2026.01)
(52) U.S. Cl.
   CPC ............... *H02J 3/381* (2013.01); *H02J 3/08* (2013.01); *H02J 3/388* (2020.01); *H02J 2300/24* (2020.01)

(58) Field of Classification Search
   CPC .... H02J 3/381; H02J 3/388; H02J 3/08; H02J 230/02; G05B 15/02
   See application file for complete search history.

(56) References Cited

U.S. PATENT DOCUMENTS 7,983,799 B2 * 7/2011 Bose ......................... H02J 3/08
                                                           700/297
9,419,442 B2 * 8/2016 Rahman ............ H02J 13/00016
                        (Continued)

FOREIGN PATENT DOCUMENTS

WO     WO-2023224648 A1 * 11/2023 ................ H02J 3/18

OTHER PUBLICATIONS

A. K. Podder, N. K. Roy, and H. R. Pota, "MPPT methods for solar PV systems: a critical review based on tracking nature," IET Renewable Power Generation, vol. 13, No. 10, pp. 1615-1632, 2019.

(Continued)

*Primary Examiner* — Thomas K Pham
(74) *Attorney, Agent, or Firm* — Kilpatrick Townsend & Stockton LLP

(57)           ABSTRACT

A microgrid (MG) controller can control a plurality of distributed generators (DGs) of photovoltaic (PV) arrays. The MG controller can include a power sharing unit configured to share power proportionally in a single current controlled mode (CCM) between the plurality of DGs based on a power capacity for each DG. The power sharing unit can include a robust current droop controller (RCDC) configured to provide proportional active current shared between the plurality of DGs. The power sharing unit can also include a quasi-proportional resonant (QPR) regulator coupled to the RCDC within a unified architecture. The QPR regulator can be configured to regulate a reference current signal.

15 Claims, 35 Drawing Sheets

(56) References Cited

U.S. PATENT DOCUMENTS

| | | | | | |
|---|---|---|---|---|---|
| 9,804,623 | B2 * | 10/2017 | Ansari | ...................... | H02J 3/46 |
| 2013/0041516 | A1 * | 2/2013 | Rockenfeller | ............ | H02J 3/38 |
| | | | | | 700/287 |
| 2019/0190274 | A1 * | 6/2019 | Fazeli | ...................... | H02J 7/35 |
| 2022/0121260 | A1 * | 4/2022 | King | ...................... | H02J 3/381 |

OTHER PUBLICATIONS

R. Ahmad, A. F. Murtaza, and H. A. Sher, "Power tracking techniques for efficient operation of photovoltaic array in solar applications-A review," Renewable and Sustainable Energy Reviews, vol. 101, pp. 82-102, 2019.

M. M. Hanif, "Investigation to Improve the Control and Operation of a Three-phase Photovoltaic Grid-tie Inverter," PHD Thesis, Dublin Institute of Technology, 2011.

H. Bounechba, A. Bouzid, H. Snani, and A. Lashab, "Real time simulation of MPPT algorithms for PV energy system," International Journal of Electrical Power & Energy Systems, vol. 83, pp. 67-78, 2016.

D. C. Huynh and M. W. Dunnigan, "Development and Comparison of an Improved Incremental Conductance Algorithm for Tracking the MPP of a Solar PV Panel," IEEE Trans. Sustain. Energy, vol. 7, No. 4, pp. 1421-1429, Oct. 2016, doi: 10.1109/TSTE.2016. 2556678.

X. Li, H. Wen, Y. Hu, Y. Du, and Y. Yang, "A Comparative Study on Photovoltaic MPPT Algorithms under EN50530 Dynamic Test Procedure," IEEE Transactions on Power Electronics, pp. 1-1, 2020, doi: 10.1109/TPEL.2020.3024211.

X. Zhang, D. Gamage, B. Wang, and A. Ukil, "Hybrid Maximum Power Point Tracking Method Based on Iterative Learning Control and Perturb Observe Method," IEEE Transactions on Sustainable Energy, pp. 1-1, 2020, doi: 10.1109/TSTE.2020.3015255.

T. N. Gupta, B. Singh, and S. B. Q. Naqvi, "Performance Evaluation of Single-Phase PV-BES Based Microgrid with Seamless Transition Capability," IEEE Transactions on Industrial Electronics, pp. 1-1, 2020, doi: 10.1109/TIE.2020.3016256.

W. Zhu, L. Shang, P. Li, and H. Guo, "Modified hill climbing MPPT algorithm with reduced steady-state oscillation and improved tracking efficiency," The Journal of Engineering, vol. 2018, No. 17, pp. 1878-1883, 2018, doi: 10.1049/joe.2018.8337.

N. Kumar, B. Singh, and B. K. Panigrahi, "PNKLMF-Based Neural Network Control and Learning-Based HC MPPT Technique for Multiobjective Grid Integrated Solar PV Based Distributed Generating System," IEEE Transactions on Industrial Informatics, vol. 15, No. 6, pp. 3732-3742, Jun. 2019, doi: 10.1109/TII.2019.2901516.

M. Al-Soeidat, D. D.-C. Lu, and J. Zhu, "An analog BJT-tuned maximum power point tracking technique for PV systems," IEEE Transactions on Circuits and Systems II: Express Briefs, vol. 66, No. 4, pp. 637-641, 2018.

M. Zolfaghari, S. H. Hosseinian, S. H. Fathi, M. Abedi, and G. B. Gharehpetian, "A New Power Management Scheme for Parallel-Connected PV Systems in Microgrids," IEEE Trans. Sustain. Energy, vol. 9, No. 4, pp. 1605-1617, Oct. 2018, doi: 10.1109/TSTE.2018. 2799972.

B. Guo et al., "Optimization Design and Control of Single-Stage Single-Phase PV Inverters for MPPT Improvement," IEEE Transactions on Power Electronics, vol. 35, No. 12, pp. 13000-13016, Dec. 2020, doi: 10.1109/TPEL.2020.2990923.

N. Kumar, B. Singh, and B. K. Panigrahi, "LLMLF-Based Control Approach and LPO MPPT Technique for Improving Performance of a Multifunctional Three-Phase Two-Stage Grid Integrated PV System," IEEE Transactions on Sustainable Energy, vol. 11, No. 1, pp. 371-380, Jan. 2020, doi: 10.1109/TSTE.2019.2891558.

S. K. G, S. Kinattingal, S. P. Simon, and P. S. R. Nayak, "MPPT in PV systems using ant colony optimisation with dwindling population," IET Renewable Power Generation, vol. 14, No. 7, pp. 1105-1112, 2020, doi: 10.1049/iet-rpg.2019.0875.

T.-W. Hsu, H.-H. Wu, D.-L. Tsai, and C.-L. Wei, "Photovoltaic Energy Harvester With Fractional Open-Circuit Voltage Based Maximum Power Point Tracking Circuit," IEEE Trans. Circuits Syst. II, vol. 66, No. 2, pp. 257-261, Feb. 2019, doi: 10.1109/TCSII. 2018.2838672.

H. A. Sher, K. E. Addoweesh, and K. Al-Haddad, "An Efficient and Cost-Effective Hybrid MPPT Method for a Photovoltaic Flyback Microinverter," IEEE Transactions on Sustainable Energy, vol. 9, No. 3, pp. 1137-1144, Jul. 2018, doi: 10.1109/TSTE.2017.2771439.

M. Lasheen, A. K. A. Rahman, M. Abdel-Salam, and S. Ookawara, "Adaptive reference voltage-based MPPT technique for PV applications," IET Renewable Power Generation, vol. 11, No. 5, pp. 715-722, 2017.

X. Li, H. Wen, Y. Zhu, L. Jiang, Y. Hu, and W. Xiao, "A Novel Sensorless Photovoltaic Power Reserve Control With Simple Real-Time MPP Estimation," IEEE Trans. Power Electron., vol. 34, No. 8, pp. 7521-7531, Aug. 2019, doi: 10.1109/TPEL.2018.2880461.

S. Ozturk and I. Cadirci, "A Generalized and Flexible Control Scheme for Photovoltaic Grid-Tie Microinverters," IEEE Trans. on Ind. Applicat., vol. 54, No. 1, pp. 505-516, Jan. 2018, doi: 10.1109/ TIA.2017.2753175.

K. Yan, Y. Du, and Z. Ren, "MPPT Perturbation Optimization of Photovoltaic Power Systems Based on Solar Irradiance Data Classification," IEEE Transactions on Sustainable Energy, vol. 10, No. 2, pp. 514-521, Apr. 2019, doi: 10.1109/TSTE.2018.2834415.

M. Killi and S. Samanta, "Modified Perturb and Observe MPPT Algorithm for Drift Avoidance in Photovoltaic Systems," IEEE Trans. Ind. Electron., vol. 62, No. 9, pp. 5549-5559, Sep. 2015, doi: 10.1109/TIE.2015.2407854.

Y. Han, H. Li, P. Shen, E. A. A. Coelho, and J. M. Guerrero, "Review of active and reactive power sharing strategies in hierarchical controlled microgrids," IEEE Transactions on Power Electronics, vol. 32, No. 3, pp. 2427-2451, 2017.

Q.-C. Zhong and Y. Zeng, "Universal Droop Control of Inverters With Different Types of Output Impedance.," IEEE Access, vol. 4, pp. 702-712, 2016.

Y. Zeng, "Droop Control of Parallel-Operated Inverters," PHD Thesis, University of Sheffield, 2016.

G. G. Talapur, H. Suryawanshi, L. Xu, and A. Shitole, "A Reliable Micro-grid with Seamless Transition between Grid Connected and Islanded Mode for Residential Community with Enhanced Power Quality," IEEE Transactions on Industry Applications, 2018.

K.-R. Kim, C.-Y. Oh, T.-J. Kim, J.-P. Lee, and H.-J. Kim, "Implementation of a Smart Power Conditioning System for Energy Storage System with a Novel Seamless Transfer Strategy," Energies, vol. 11, No. 5, p. 1108, 2018.

X. Hou et al., "Distributed Hierarchical Control of AC Microgrid Operating in Grid-Connected, Islanded and Their Transition Modes," IEEE Access, vol. 6, pp. 77388-77401, 2018.

M. A. Aboushal and M. M. Z. Moustafa, "A new unified control strategy for inverter-based micro-grid using hybrid droop scheme," Alexandria Engineering Journal, vol. 58, No. 4, pp. 1229-1245, Dec. 2019, doi: 10.1016/j.aej.2019.10.006.

S. Golestan, J. M. Guerrero, and J. C. Vasquez, "Three-Phase PLLs: A Review of Recent Advances," IEEE Transactions on Power Electronics, vol. 32, No. 3, pp. 1894-1907, Mar. 2017, doi: 10.1109/ TPEL.2016.2565642.

Z. Ali, N. Christofides, L. Hadjidemetriou, E. Kyriakides, Y. Yang, and F. Blaabjerg, "Three-phase phase-locked loop synchronization algorithms for grid-connected renewable energy systems: A review," Renewable and Sustainable Energy Reviews, vol. 90, pp. 434-452, Jul. 2018, doi: 10.1016/j.rser.2018.03.086.

F. Blaabjerg, Control of power electronic converters and systems, vol. 2. Academic Press, 2018.

Q.-C. Zhong and D. Boroyevich, "Structural resemblance between droop controllers and phase-locked loops," IEEE Access, vol. 4, pp. 5733-5741, 2016.

J. He, Y. W. Li, and F. Blaabjerg, "Flexible microgrid power quality enhancement using adaptive hybrid voltage and current controller," IEEE Transactions on Industrial Electronics, vol. 61, No. 6, pp. 2784-2794, 2014.

(56) References Cited

OTHER PUBLICATIONS

Q.-C. Zhong, W.-L. Ming, and Y. Zeng, "Self-Synchronized Universal Droop Controller.," IEEE Access, vol. 4, pp. 7145-7153, 2016.

N. Blair et al., "System advisor model, sam 2014.1. 14: General description," National Renewable Energy Lab.(NREL), Golden, CO (United States), 2014.

M. A. Aboushal, M. M. Z. Moustafa, and M. A. El-Gammal, "A New Self-Synchronized Strategy for Grid-Connected Three Phase Voltage Source Inverters," in 2019 IEEE PES Asia-Pacific Power and Energy Engineering Conference (APPEEC), Macao, Macao, Dec. 2019, pp. 1-6, doi: 10.1109/APPEEC45492.2019.8994704.

* cited by examiner

1200

Start ~1202

Measure $V_{PV}$ and $I_{PV}$ ~1204

Calculate $P_{PV}(n)$ and $I_{PV}(n) \cdot V_{PV}(n)$ ~1206

$dP_{PV} = P_{PV}(n) - P_{PV}(n-1)$ ~1208

1210~ $dP_{PV} > 0$    Yes

No

Yes    $dV_{PV} > 0$    1212~    $dV_{PV} > 0$    Yes

1218~    No    No

1220~ Decrease $V_{dc\_ref}$    Increase $V_{dc\_ref}$    Decrease $V_{dc\_ref}$    Increase $V_{dc\_ref}$ ~1214

1222    1216

$P_{PV}(n-1) = P_{PV}(n)$ ~1224

Return ~1226

1300

Start 〜1302

Measure rms phase current $I_{Lph}$ of the VSI 〜1304

$dI_{Lph} = I_{Lph}\,(n)–I_{Lph}\,(n–1)$ 〜1306

1308〜 $dI_{Lph} = 0$    Yes

No

Yes    $dI_{Lph} > 0$ 〜1310

No

Increase $V_{dc\_ref}$

Decrease $V_{dc\_ref}$ 〜1314

1312

$I_{Lph}\,(n–1)=I_{Lph}\,(n)$ 〜1316

Return 〜1318

PLL-less frequency detector

1301

SSM with the main grid

1303

1900

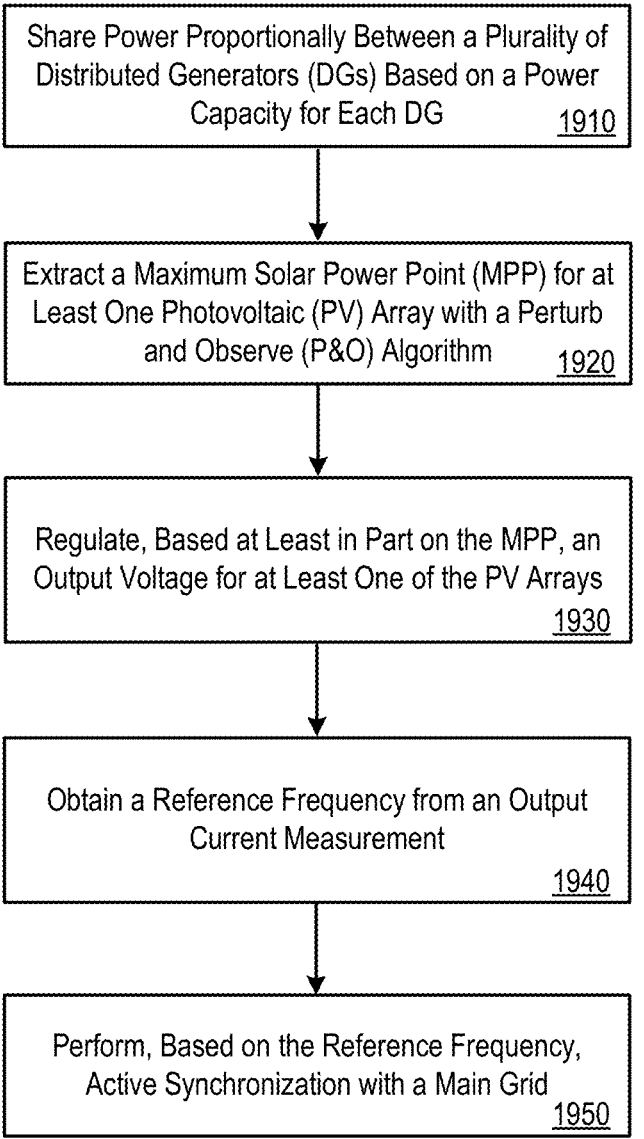

Share Power Proportionally Between a Plurality of Distributed Generators (DGs) Based on a Power Capacity for Each DG <u>1910</u>

Extract a Maximum Solar Power Point (MPP) for at Least One Photovoltaic (PV) Array with a Perturb and Observe (P&O) Algorithm <u>1920</u>

Regulate, Based at Least in Part on the MPP, an Output Voltage for at Least One of the PV Arrays <u>1930</u>

Obtain a Reference Frequency from an Output Current Measurement <u>1940</u>

Perform, Based on the Reference Frequency, Active Synchronization with a Main Grid <u>1950</u>

UNIVERSAL CONTROL UNIT FOR PV FED SINGLE STAGE INVERTERS

CROSS-REFERENCES TO RELATED APPLICATIONS

This application claims the benefit of U.S. Provisional Application No. 63/326,531 filed Apr. 1, 2022, the entire contents of which are hereby incorporated for all purposes in their entirety.

BACKGROUND OF THE INVENTION

Conventional power grids mainly depend on centralized generation, power transmission and power distribution systems. The conventional power grids can be characterized by a few disadvantages. For instance, the conventional power grids can rely on a centralized generation unit which, upon failure can lead to a complete black-out. Unless an extension of a grid is implemented, load shedding may become necessary as a consequence of load growth each decade. However, an expansion of power networks in conventional power grids can be expensive. The expansion can include long transmission lines (TL) and bulky distribution transformers resulting in solution infeasibility, especially in remote rural areas and islands. Moreover, a depletion of conventional fossil fuel and associated environmental impacts can pose another limitation which encounter conventional power networks. Furthermore, an efficiency of fossil fuel-based power stations (FFBPS) can be quite low, particularly during light or zero load conditions, exposing conventional power networks to high power losses as observed with coal, natural gas, and diesel generators.

Interconnected distributed generators (DGs) can represent a potential alternative to centralized generation. Interconnected DGs can eliminate a need of load shedding by incorporating new renewable energy sources (RES), such as photovoltaic (PV), wind turbine, fuel cell, etc. RES can be installed near a location of load consumers, obviating a necessity for long transmission and distribution systems. Issues of low efficiency FFBPS and high-power losses during light loading associated with FFBPS can be evaded by sharing loads through incorporated RES. Arrangements where RES are combined with FFBPS to share energy loads can form micro-grids (MGs).

PV based solar power stations may play a major role in renewable energy generation worldwide. For example, United Arab Emirates, UAE, has multiple solar energy projects such as a Noor Abu Dhabi solar power plant that began commercial operations in April 2019 providing 1.2 GW of solar power to the UAE national grid. Another example is a leading solar project in Abu Dhabi named Al Dhafra Solar Project. The Al Dhafra Solar project has an installation capacity of 2 GW. MG controllers can help incorporate RES into MG systems.

BRIEF SUMMARY OF THE INVENTION

A micro-grid (MG) controller can implement renewable energy sources (RES) into MG systems. For example, a MG controller for a plurality of distributed generators (DGs) of photovoltaic (PV) arrays described herein can include a power sharing unit configured to share power proportionally in a single current controlled mode (CCM) between the plurality of DGs based on a power capacity for each DG of the plurality of DGs. The power sharing unit can include a robust current droop controller (RCDC) configured to provide proportional active current shared between the plurality of DGs. The power sharing unit can also include a quasi-proportional resonant (QPR) regulator coupled to the RCDC within a unified architecture, the QPR regulator configured to regulate a reference current signal.

In another example, a MG controller for a plurality of distributed generators (DGs) of Renewable Energy Sources (RESs) described herein can include a power sharing unit configured to share power proportionally in a single current controlled mode (CCM) between the plurality of DGs based on a power capacity for each DG of the plurality of DGs. The power sharing unit can include a robust current droop controller (RCDC) configured to provide proportional active current shared between the plurality of DGs. The power sharing unit can also include a quasi-proportional resonant (QPR) regulator coupled to the RCDC within a unified architecture, the QPR regulator configured to regulate a reference current signal.

In another example, a method for controlling a microgrid of a plurality of distributed generators (DGs) of photovoltaic (PV) arrays described herein can include sharing power proportionally in a single current controlled mode (CCM) between the plurality of DGs based on a power capacity for each DG of the plurality of DGs. Sharing the power proportionally can include regulating a reference current signal with a quasi-proportional resonant (QPR) regulator within a unified architecture with a robust current droop controller (RCDC). Sharing the power proportionally can also include providing, based on the reference current signal, a proportional active current shared between the plurality of DGs.

BRIEF DESCRIPTION OF THE DRAWINGS

FIG. 19 is a flow chart of a process for controlling a plurality of DGs by a MG controller according to one example of the present application.

DETAILED DESCRIPTION OF THE INVENTION

Figure 1:
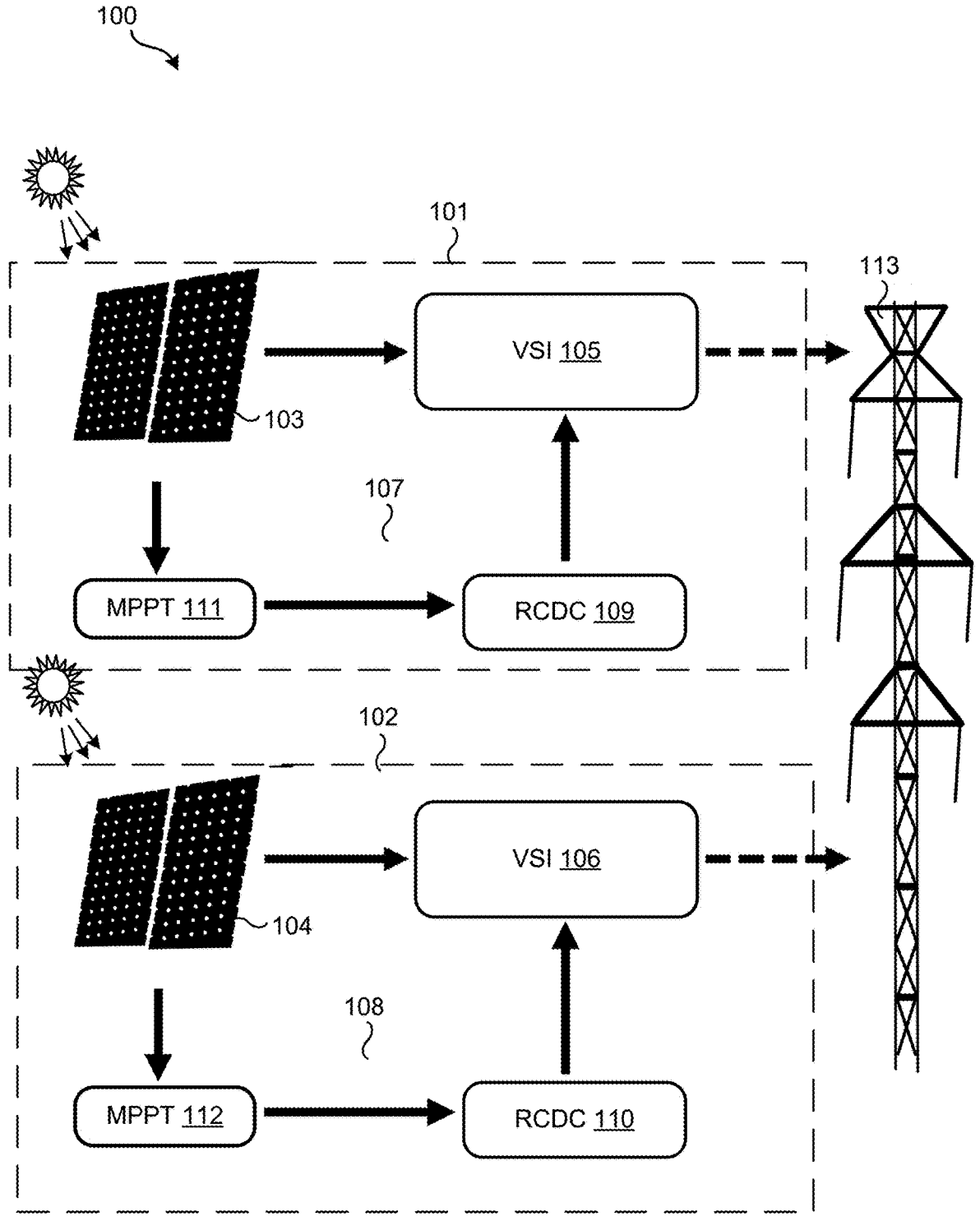
FIG. 1 is a schematic of two DGs of an MG that each employ a MG controller according to one example of the present application.

Nomenclature $V_{dc}$ DC link voltage
$V_{PV}$ PV array output voltage
$I_{PV}$ PV array output current
$P_{PV}$ Input power of the PV array
N Total number of parallel inverters
j An integer ranged between 1 to N
$L_f$, $C_f$ LC Filter Inductance and capacitance
$E_{jabc}$ Input voltages of the LC filter
$I_{Ljabc}$ Inductor current of the LC filter
$V_{ojabc}$, $I_{ojabc}$ Grid side output voltage and current
$Z_{Linej}$ Coupling line impedance
PCC Point of common coupling
$Z_{Load}$ Load impedance at the PCC
STC Standard test condition of PV systems
$P_r$ (W) Power rating of the PV module
MPP Maximum power point of the PV module
$V_{mpp}$, $I_{mpp}$ PV output Voltage and current at the MPP
$V_{oc}$ Open circuit voltage of the PV module
$I_{sc}$ Short circuit current of the PV module
$I_{refPK}[n-1]$ Previous current magnitude
$I_{refPK}[n]$ New reference current magnitude
$E^*$, $V_{opk}$ Nominal and output voltage peak
SCD Sampling control delay
$I_{set}^*$ Active current set-point
$I_{opk}$ Measured output current magnitude
$K_e$ Integral gain of the voltage error
$k_P$, $k_i$ Proportional and resonant gains of the QPR regulator
$\omega_c$ Cut-off frequency of the QPR regulator
$m_p$ Active current droop gain
$I_{ref,mag}[n]$ Reference current drooped magnitude
$\omega_c$ Cut-off frequency of the QPR regulator
$f_{nom}$, $\omega_{nom}$ Nominal ordinary and angular frequency of the micro-grid
$f_{PR}$, $\omega_{PR}$ Ordinary and angular resonant frequency of the QPR regulator
$\theta_v$ Phase angle of inverter's output voltage
$\theta_{iref}$ Reference current angle
$E_{ref}$ Reference voltage vector of the inverter $K_{pr}$, $K_{ir}$ Proportional and integral gain of the fast frequency restoration loop $T_s$ Real time simulation sampling period $k_{pdc}$, $k_{idc}$ Proportional and integral gains of the DC link voltage controller $V_{dc\_ref}$ Reference value of the DC link voltage $V_{dc\_err}$ DC link voltage error $C_{dc}$ DC link voltage capacitance $I_{Cdc}$ DC link capacitor current $V_{gdq}$ Direct and quadrature axes voltages of the main utility grid $\alpha\beta$-STF $\alpha\beta$ stationary frame dq-SRF dq synchronous reference frame $V_{g\alpha\beta}$, $V_{o\alpha\beta}$ Main grid and inverter voltages in $\alpha\beta$-STF $I_{L\alpha\beta}$ Inductor current in $\alpha\beta$-STF $I_{ref\alpha\beta}$ Reference current vector in $\alpha\beta$-STF $f_{vDG}$, $\omega_{vDG}$ Ordinary and angular output frequency of the inverter's output voltage waveform $f_{nom}$ Nominal frequency of the MG $\Delta f_{vDG}$ Frequency synchronization term Certain aspects and features relate to systems and methods incorporating a micro-grid (MG) controller that can implement renewable energy sources (RES) into MG systems. The MG controller can control a plurality of single-phase inverters connected in parallel and can simultaneously cause each single-phase inverter of the plurality to provide power. After one of the single-phase inverters is faulted, any other single-phase inverter can automatically bear a load of the faulted single-phase inverter, so that a problem of a restarting delay of a mutual backup module is avoided. A real uninterrupted power supply from an MG system can be realized. High reliability can be achieved and influences to vehicle driving can be avoided. The MG controller can offer a level of flexibility and simplicity that can help promote and boost use of RES on both national and international levels.

Compared to conventional grid controllers, the MG controller can include a reduced number of control loops, less measurements and signal conditioning, minimized computational burdens, an uncertainty free design, and eliminated synchronization units (i.e., PLL-less based approach). The MG controller can be incorporated with inverters used by industrial manufacturers. In addition, the MG controller can be targeted for utilities and energy providers for an efficient integration of Distributed Energy Resources (DERs), with incorporated RES, on a standalone basis and/or while connected with a main grid. The RES can include solar energy sources, such as photovoltaic (PV) arrays.

Solar energy sources can offer several advantages including sustainability, eco-friendly power and a stabilized global energy price. One challenge facing solar energy sources can be a limited generation capacity worldwide compared to FFBPS. Solar energy sources can present an additional technical challenge. PV arrays can create complexity for MG controllers because PV arrays have two main operating conditions when the PV arrays are connected to a main grid. The two operating conditions can be referred to as Grid Connected Mode (GCM) and a stand-alone mode or Islanded Mode (ISM). Operations associated with PV arrays can also include a technical challenge in detecting a Maximum solar Power Point (MPP).

The MG controller can include multiple components such as a power sharing unit, a DC-link voltage regulation unit, and a PLL-less SSM unit for active synchronization. Each of three sections below will provide details for such components.

I. The Power Sharing Unit

A first component of the MG controller, the power sharing unit, can share power proportionally between DGs based on capacity of each DG. The power sharing unit can employ a unified current controlled approach or current controlled mode (CCM) for parallel Voltage Source Inverters (VSIs) which can hold many advantages over conventional voltage control methods. The unified current controlled approach can produce an outstanding transient response compared to conventional P-Q control methods. The power sharing unit can overcome or avoid challenges present for existing technologies, such as transport delays, signal conditioning, and cumbersome mathematical calculations.

Regarding power sharing, conventional controllers can use droop-based control-methods in voltage control mode (VCM) to support dual mode of operation for parallel inverters in micro-grids (MGs). However, droop-based control methods in VCM can be prone to many disadvantages. Examples of the disadvantages can include design dependency on uncertain effective line impedance (EFLI), power sharing deviations particularly for reactive power due to mismatched EFLIs among parallel DGs, poor dynamic response owing to bandwidth limitation influenced by a dual voltage-current loop architecture, the lack of adaptability with load variations considering an inertia-less nature of VSIs, and an indirect control of line currents since P-Q are used as a main control variable resulting in poor power quality. To enhance power quality in the conventional controllers, fast islanding detection (ID) and transient mitigation strategies can be used for switching over between VCM and CCM subsequent to MG operating mode changes from ISM to GCM, and vice versa.

In contrast to conventional controllers, the power sharing unit can employ a hybrid scheme that can encompass a robust current droop controller (RCDC) used for providing proportional active current sharing, and a quasi-proportional resonant (QPR) regulator which regulates both the reference current signal plus sharing reactive current intrinsically. Thus, the power sharing unit can offer a unified architecture operated in CCM while supporting dual mode of operation (ISM/GCM), outstanding robustness against load fluctuations, proportional sharing of P-Q output power, and a universal droop formula suitable with wide range of output impedance's angle between $-\pi/2$ to $\pi/2$ without a use of a predictive current estimator.

The power sharing unit can produce fast dynamic performance while avoiding dual voltage current loop architecture and an outer reactive droop function. The power sharing unit can incorporate a QPR technique that can have superior bandwidth compared to conventional Proportional Resonant (PR) techniques. The QPR technique can help reinforce system immunity to voltage disturbances and low order harmonics. Additionally, the power sharing unit can offer universal droop characteristics suitable with all types of line impedances and loading conditions. Thus, the MG controller can be compatible with many types of MG networks that employ various types of RES, without a need to re-formulate droop equations in compliance with output impedance.

The power sharing unit can be implemented for use with single stage multi-string PV-inverter topology. The power sharing unit can include a unified RCDC-QPR controller. The RCDC-QPR controller can effectively overcome an inertia-less nature of VSIs under various transient conditions. The conditions can include unintentional islanding, load fluctuations, and DC-link disturbances caused by intermittent input power of PV sources. The power sharing unit can maintain system stability and quick dynamic response during all times by achieving small rising and settling times as well as tenuous overshoots. Power sharing accuracy provided by the power sharing unit can be unaffected by mismatched output impedances among parallel DGs during both ISM and GCM. Furthermore, a decoupled control of output active and reactive powers can be ensured without using any virtual impedance loop or uncertainty estimators in contrast to other conventional methods. Additionally, output voltage and frequency can be maintained within the standard limits of IEEE-519 and EMC-(EN 61000) independently of employed droop gains. Hence, a tradeoff between power sharing accuracy and synchronization limits can be evaded by the power sharing unit.

An outstanding quick response can be achieved by offering an instantaneous transition from GCM to ISM and vice versa using a unified current controlled approach of the power sharing unit. The unified current controlled approach for power sharing meets standard limits of IEEE 1547, which dictates that islanding detection as well as an overall transition time should be performed within less than two seconds. A process of islanding detection can be avoided by the MG controller. Additionally, the approach avoids exhaustive delays and complications required for islanding detection and transient mitigations that are followed by other conventional approaches to switch over from current control mode CCM to voltage control mode VCM when islanding is detected. A flexible operation can be thoroughly achieved by the power sharing unit during both ISM and GCM with an ability to switch over between these two modes seamlessly through a unified CCM.

II. The DC-link Voltage Regulation Unit

A second component of the MG controller, the DC-link voltage regulation unit, can maximize generated energy from solar panels in a PV array. The DC-link voltage regulation unit can include a Perturb and Observe (P&O) Maximum solar Power Point Tracking (MPPT) control system and a DC link voltage controller. In general, an MPP can be tracked so the P&O MPPT control system can manipulate power circuit output impedance until the output impedance matches PV internal resistance at the MPP. The DC-link voltage regulation unit can be applied to single-stage PV inverters and regulate DC-link voltage without affecting a unified control architecture of the power sharing unit of the MG controller.

P&O, which is an algorithm employed by the P&O MPPT control system, can rely on a voltage to power gradient $(dV_{PV}/dP_{PV})$ in tracking the MPP. P&O may be better in terms of dynamic response and output voltage regulation at the DC-link then other algorithms for tracking the MPP. P&O algorithm may not only be a simple algorithm that grants a satisfactory dynamic response but can also offer high tracking precision for the MPP without prior knowledge of a mathematical PV model, besides granting satisfactory dynamic response. Thus, P&O has been widely employed for MPPT using two set of sensors for measuring the PV current and voltage in other conventional control units. However, the P&O algorithm can have some disadvantages. For example, the P&O algorithm can cause an inherent oscillation in an output of the PV system during the tracking process. In addition, time elapsed while oscillating around the MPP can result in wasted energy until convergence is achieved. Moreover, the convergence time can be further increased under rapidly changing atmospheric conditions leading to higher energy losses; however, such rapid variations are not very common. Thus, the DC-link voltage regulation unit can include a compromise between MPPT sampling rate and incremental step voltage in order to achieve an optimized performance with minimal oscillations.

A design of the DC-link voltage regulation unit can eliminate extra current sensors, signal conditioning, and power calculations at a DC-link side of an MG. The DC-link voltage regulation unit can rely on a single, relatively low power rating AC current sensor for measuring a per phase AC current. By comparison, conventional methods for voltage regulation can consider entire power ratings of a VSI in a DC link. Additionally, the DC-link voltage regulation unit can handle DC-link voltage variations after changes to PV input power.

A dynamic response of the P&O MPPT control system can be optimized compared to responses of conventional systems since power conditioning delays at the DC-link side can be obviated. The P&O MPPT control system can operate without a readjustment of current amplitude set-point to zero upon sudden islanding as opposed to conventional VCM based approaches.

The DC-link voltage regulation unit can operate without islanding detection. Additionally, the DC-link voltage regulation unit can avoid a DC-link voltage collapse as well as any resonant interaction between an inverter and the MG. Moreover, the tracking of the MPP can be performed under varied insolation and temperature levels, while showing good dynamic response with tenuous perturbations owing to an optimized sampling rate.

In addition, the table below presents a comparison between the P&O MPPT control system and a conventional one.

| | Proposed AC based MPPT | Conventional DC based MPPT |
|---|---|---|
| DC current sensors rating | Not considered | Full rating of the inverter is considered. |
| AC current sensors rating | One-third of the inverter's rating is considered | Not considered |
| System perturbations | Slight | Heavy, unless the incremental step voltage size is well optimized |
| Change in droop formula | No change | Must be changed under switching events in the MG |
| Islanding mode detection | Not part of operation | Required |
| P&O Algorithm | Simple | More complicated |

III. The PLL-less SSM Control Scheme

A third component of the MG controller is the PLL-less SSM control scheme. The PLL-less SSM control scheme can include two components: a PLL-less frequency detector and a PLL-less SSM unit. The PLL-less SSM control scheme can incorporate parallel inverters into the MG during both ISM and GCM without using a dedicated synchronization unit. The PLL-less SSM control scheme can exploit the droop function to obtain a reference frequency, thus acquiring voltage angle information for synchronization without using a dedicated PLL. Depending on an output reactive current measured locally, frequency information can be efficiently detected. Accordingly, complicated tuning and related stability issues attributed to conventional PLLs can be obviated.

The active synchronization method employed by the PLL-less SSM control scheme can show high accuracy, where active synchronization with the main grid can be achieved within less than three fundamental cycles under different lag/lead scenarios between an output voltage of the inverter and the main grid. The PLL-less SSM unit can be extended on the RCDC instead of a VCM based droop. In addition, general guidelines can be outlined through quantitative analysis for the intrinsic droop characteristics of the employed QPR regulator. An output frequency can be readily detected during all modes in a PLL-less manner.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of two DGs of an MG 100 that each employ a MG controller unit according to one example of the present application. The first DG 101 includes a photovoltaic array 103, a CCVSI 105, and a MG control unit 107. The MG control unit 107 includes an RCDC control unit 109 and a P&O MPPT control system 111. The second DG 102 includes a photovoltaic array 104, a CCVSI 106, and a MG control unit 108. The MG control unit 108 includes an RCDC control unit 110 and a P&O MPPT control system 112. Each RCDC control unit can regulate power sharing between the DGs. The P&O MPPT control systems can track MPP and help maximize generated energy from solar panels in the PV arrays. Both DGs are connected to a main grid 113.

Figure 2:
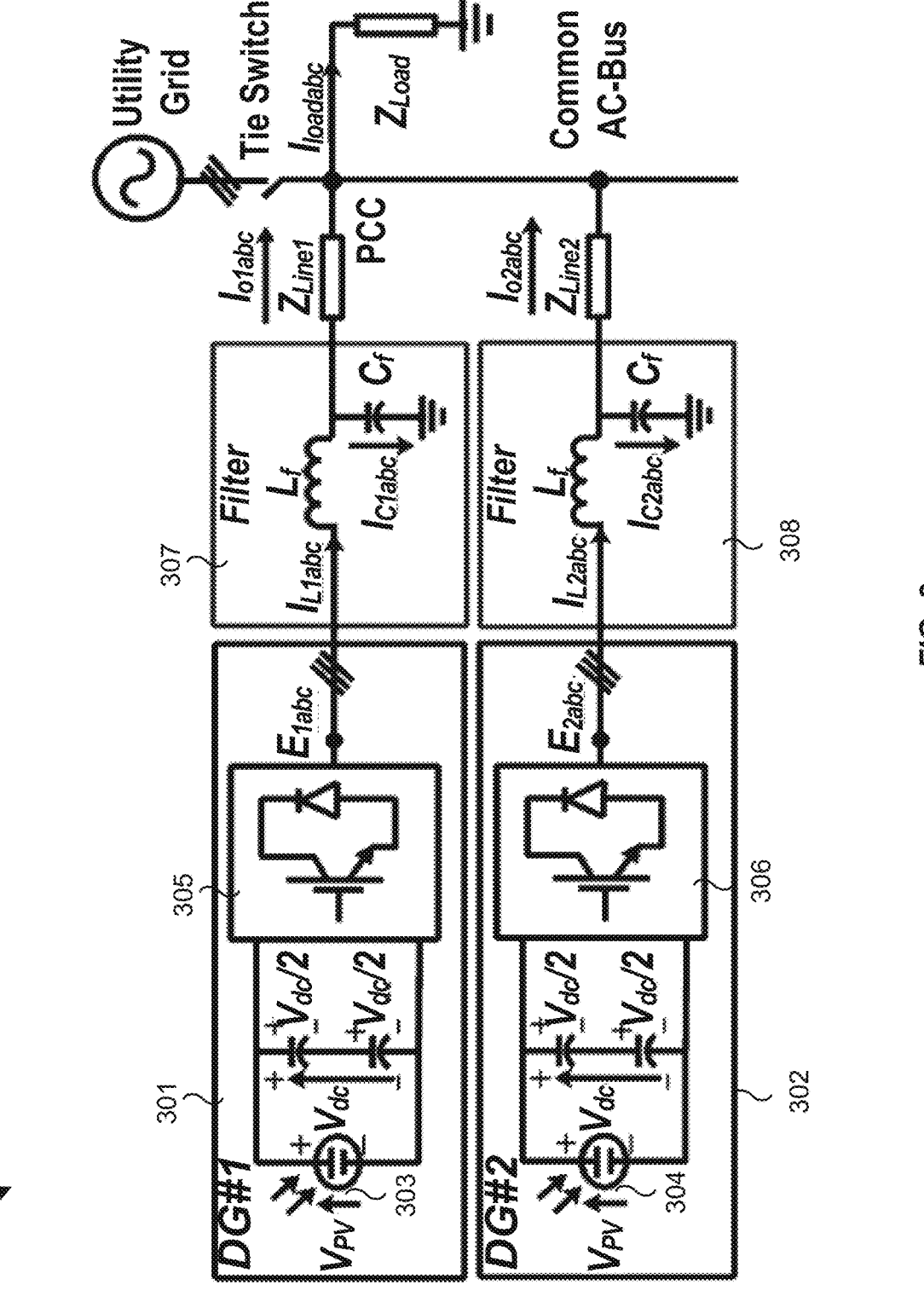
FIG. 2 is a circuit diagram of a low voltage (LV) MG system according to one example of the present application.

FIG. 2 is a circuit diagram of a low voltage (LV) MG system 300 according to one example of the present application. The LVMG system 300 includes a first DG 301 and a second DG 302. The first DG 301 includes a multi-string PV array 303, a three phase VSI 305, and an output LC filter 307. The three phase VSI 305 can be fed by the multi-string PV array 303 and interfaced through the output LC filter 307 and coupling lines with parallel linkage at a PCC. The second DG 302 includes a multi-string PV array 304, a three phase VSI 306, and an output LC filter 308. The three phase VSI 306 can be fed by the multi-string PV array 304 and interfaced through the output LC filter 308 and coupling lines with parallel linkage at a PCC. Adopted PV module parameters can be extracted from Sunpower (SPR-315E-WHT-D) module data encompassed within a library of MATLAB/Simulink software.

Figure 3:
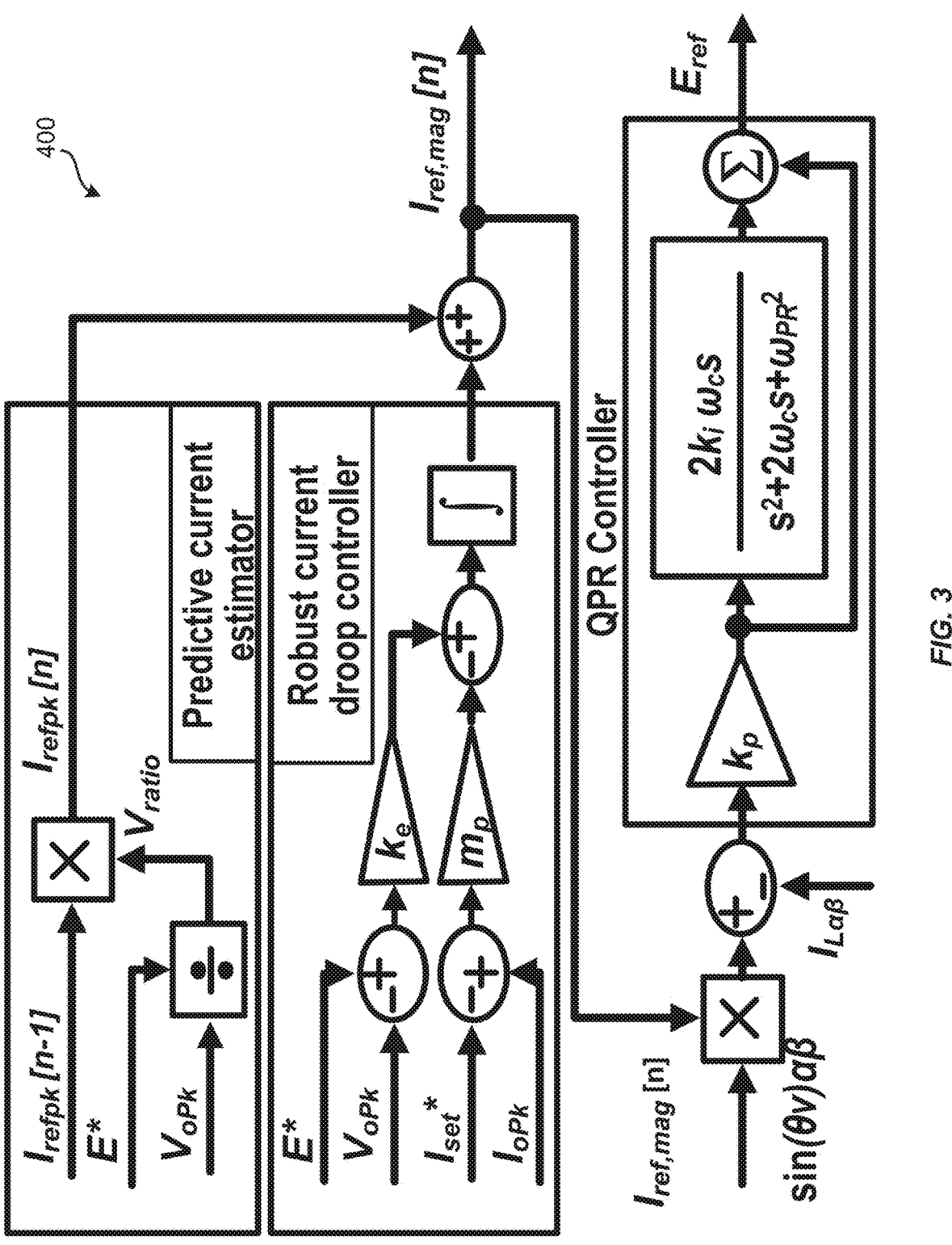
FIG. 3 is a schematic diagram of a MG controller according to one example of the present application.

FIG. 3 is a schematic diagram of a MG control unit 400 according to one example of the present application. The MG control unit 400 can include a predictive current estimator linked with an RCDC and a QPR inner regulator as shown in FIG. 3. The MG control unit 400 can accept any current set-point $I_{set}^*$ ranged from zero to $I_{rated}$ provided that an ideal DC-link source is available. Accordingly, $I_{set}^*$ can be adjusted at the rated current at any time. Hence, inverters can be pushed up to a maximum power rating during GCM, while sharing a common load proportionally during ISM. Nonetheless, a unified setting of $I_{set}^*$ cannot directly be used when the inverter is interfaced to a PV source since a DC-link voltage can no longer be maintained. For clarity, the unified setting of $I_{set}^*$ when solar insolation level is decreased to a certain level such that the current at the MPP ($I_{mp}$) is smaller than the specified current set-point, $I_{set}^*$. A mismatch between an input power and controller settings can lead to a sudden collapse in a DC-link voltage since a control set-point cannot be physically met. Thus, the MG control unit 400 may try to increase an output current for tracking $I_{set}^*$, but at an expense of DC voltage relegation. The DC-link voltage $V_{dc}$ can be denoted by the equation below:

$$V_{dc} = \frac{2\sqrt{2}}{\sqrt{3}} \times \frac{V_{LLrms}}{m_a} \tag{1}$$

Hence, under a maximum amplitude modulation index ($m_{a\_max}=1$) in a linear range, a minimum DC-link voltage ($V_{dc\_min}$) permissible for the operation of a VSI can be 508.0682 Volt. Taking a factor of safety (10-20%) into account for considering power and switching losses, then $V_{dc\_min}$ can be estimated at 600 Volt. Consequently, when the DC-link voltage becomes far beyond $V_{dc\_min}$, then a completely deteriorated response may result, leading to system instability. Thereby, the RCDC may not facilitate an integration of the multi-string PV inverter in a case where the current set-point $I_{set}^*$ remains fixed, disregarding the DC-link voltage variations.

Figure 4:
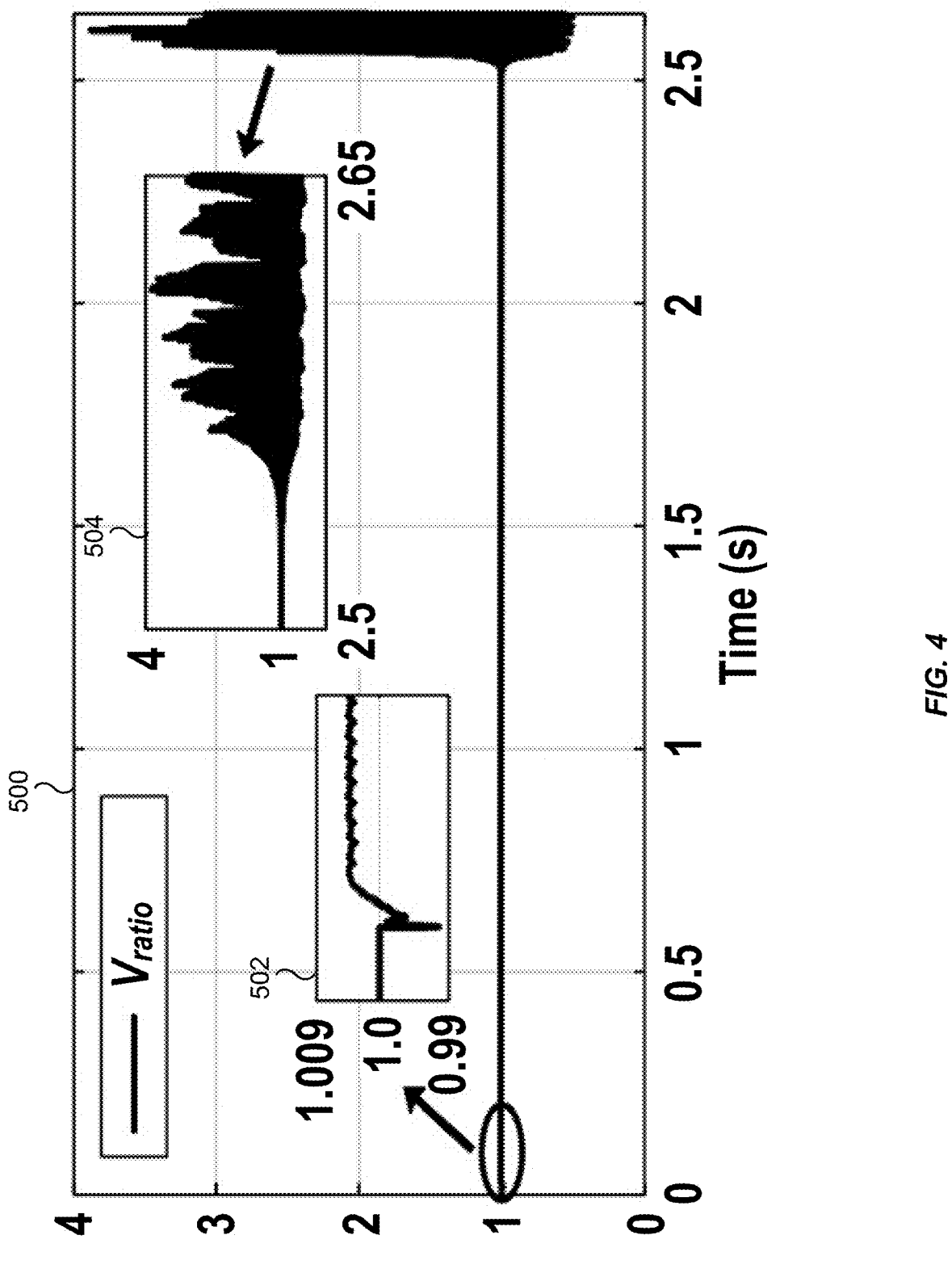
FIG. 4 is a graph of a ratio of nominal over output voltage applied for current scaling versus time according to one example of the present application.

FIG. 4 is a graph 500 of a ratio of nominal over output voltage applied for current scaling versus time according to one example of the present application. A limitation can be brought by resonance interactions between an inverter's harmonics and MG network impedances. Resonant harmonics can be stimulated by a predictive current scaling method using a feed-forward current multiplier ($V_{ratio}$). The feed-forward current multiplier can be oscillatory, adding harmonics distortions to a reference signal, as depicted in FIG. 4. FIG. 4 includes two sub-plots within graph 500. A first subplot 502 zooms in on an early portion of graph 500. A second subplot 504 zooms in on a time range between 2.5 and 2.6 seconds. Both subplots highlight harmonic distortions in the graph.

Figure 5:
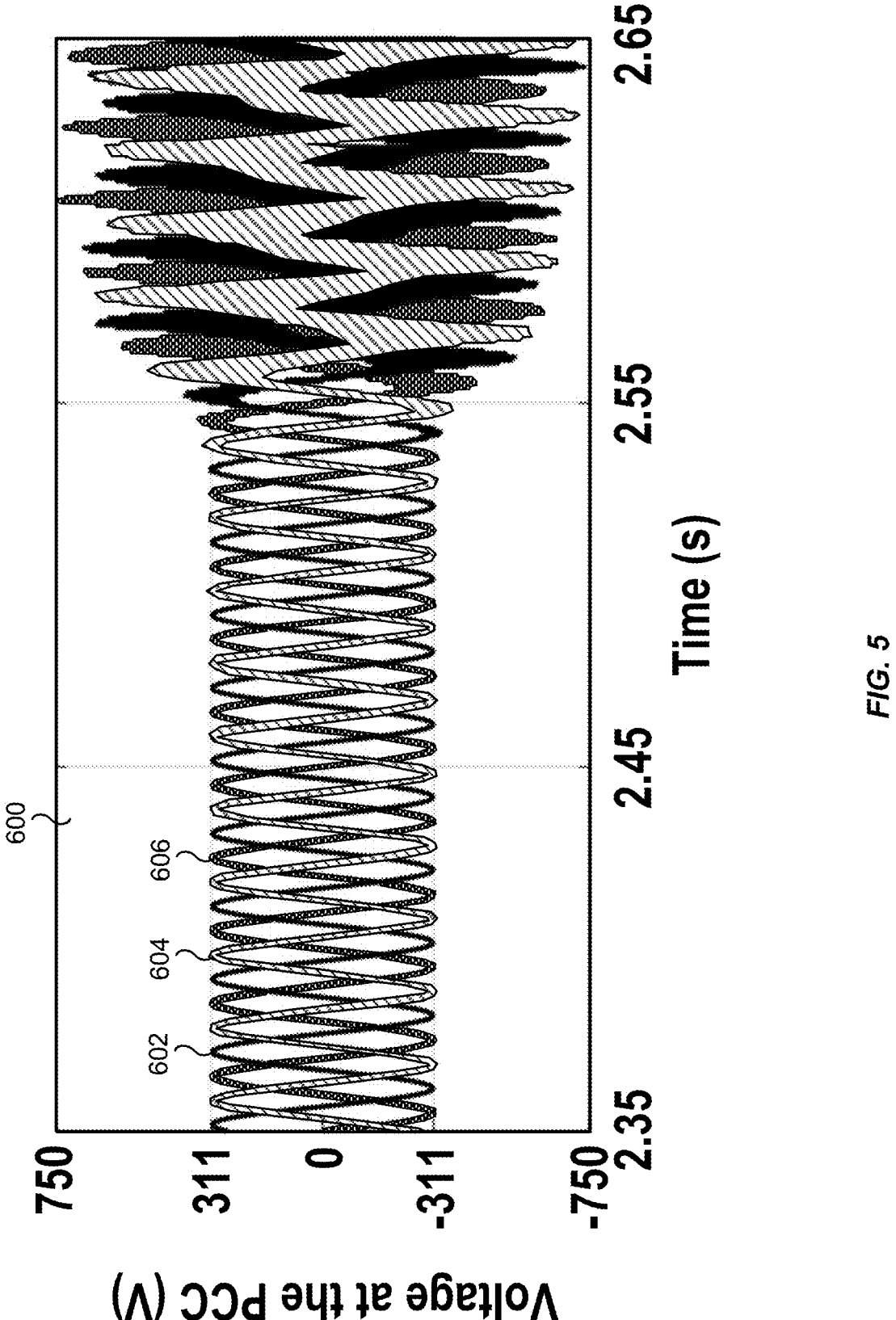
FIG. 5 is a graph of voltage at a point of common coupling (PCC) for an MG versus time according to one example of the present application.

FIG. 5 is a graph 600 of voltage at a point of common coupling (PCC) for an MG versus time according to one example of the present application. Harmonic distortions added to a reference signal can lead to an emergence of resonance phenomena in the output voltage at the PCC. The harmonic distortions occur after 2.55 seconds (shown with elements labeled as 602, 604, 606 in FIG. 5) and seem to coincide with harmonic distortions of second subplot 504 in FIG. 4.

Figure 6:
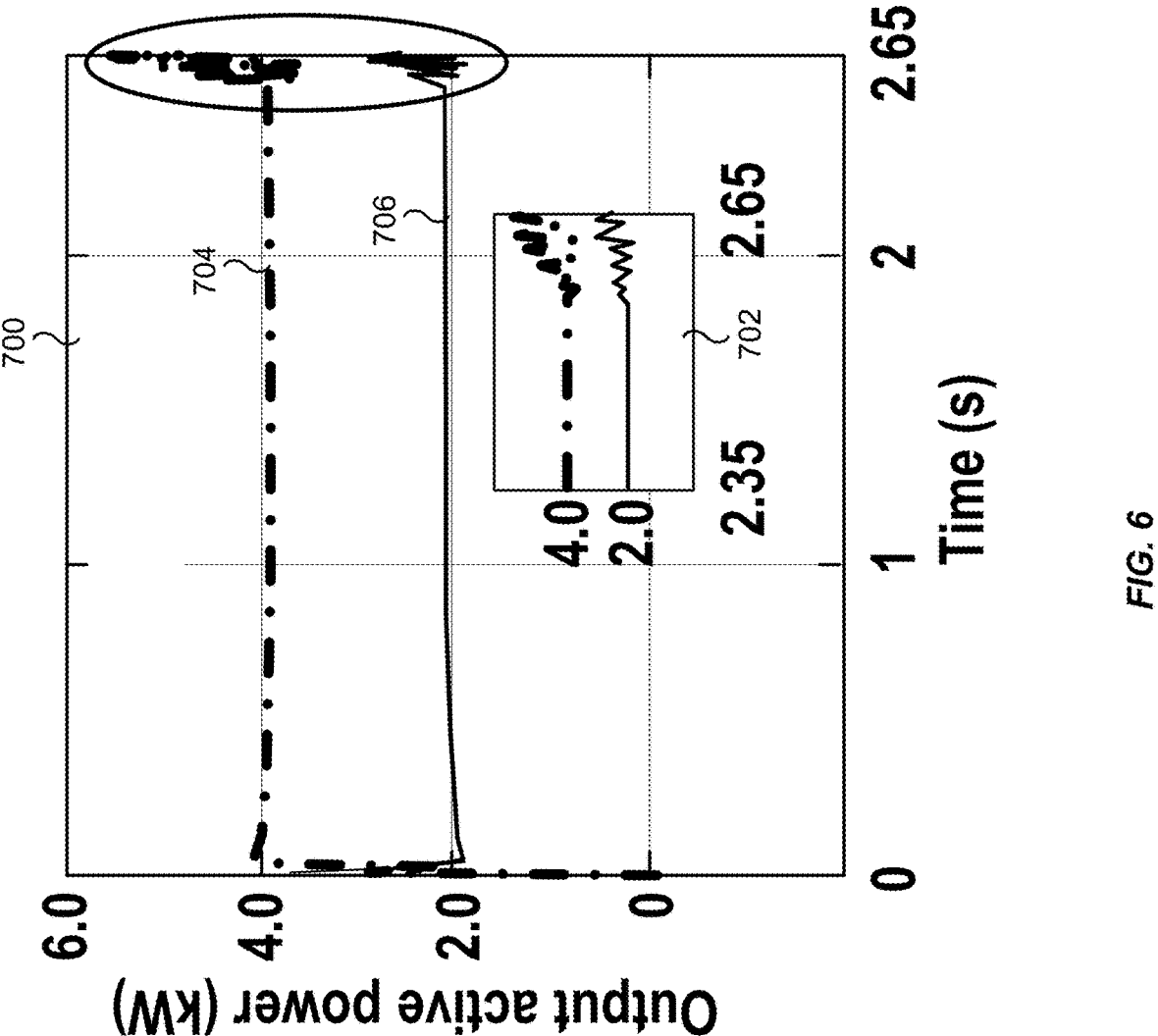
FIG. 6 is a graph of active output powers associated with two separate DGs versus time according to one example of the present application.

FIG. 6 is a graph 700 of active output powers associated with two separate DGs versus time according to one example of the present application. A curve 704 exhibits active output power for a first DG and a curve 706 exhibits active output power for a second DG. Harmonic distortions added to a reference signal can lead to an emergence of resonance phenomena in the active output powers of the two separate DGs. Graph 702 is a sub-graph of graph 700 that highlights resonance phenomena occurring after 2.35 seconds for both DGs.

Figure 7:
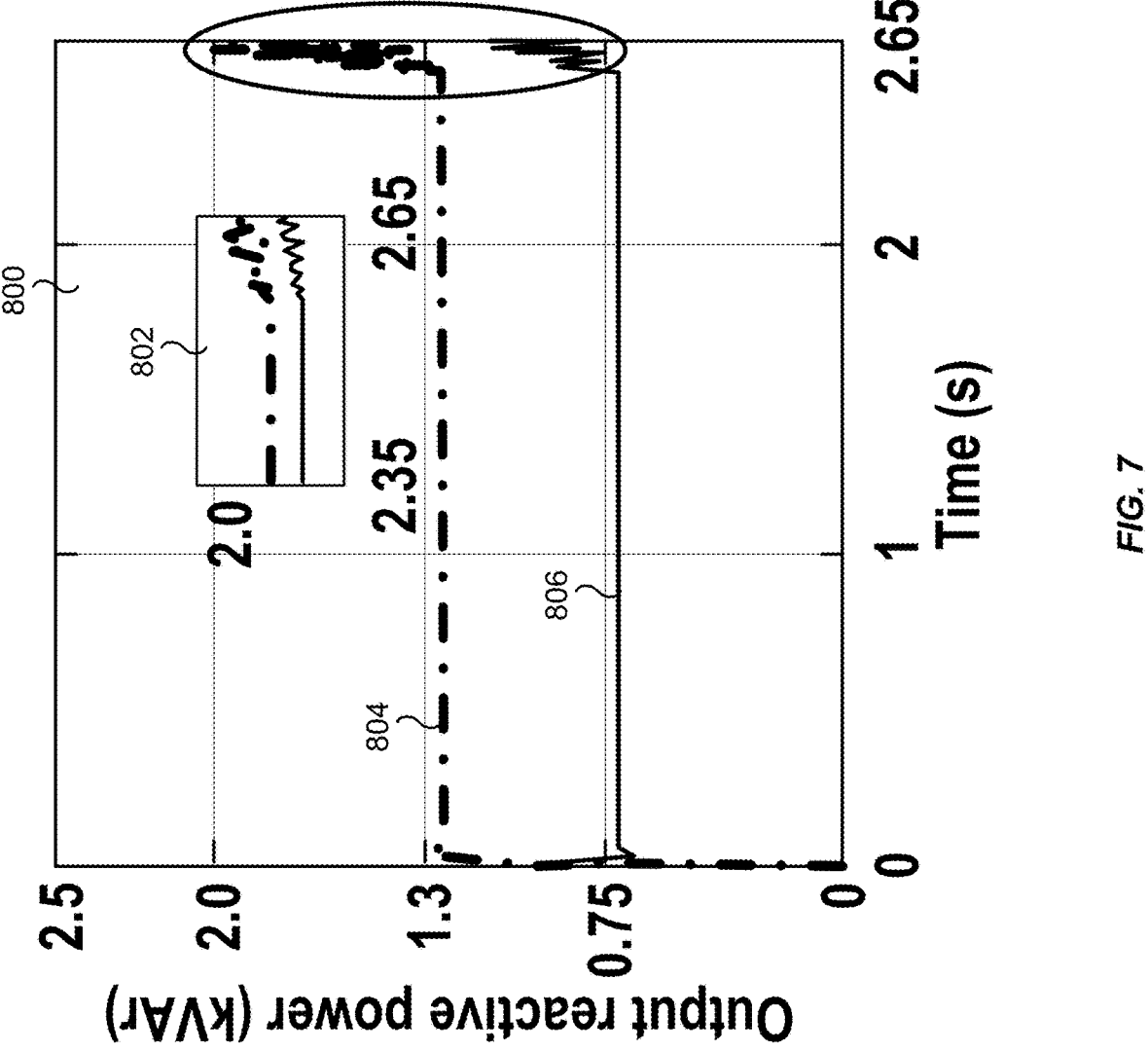
FIG. 7 is a graph of reactive output powers associated with two separate DGs versus time according to one example of the present application.

FIG. 7 is a graph 800 of reactive output powers associated with two separate DGs versus time according to one example of the present application. A curve 804 exhibits reactive output power for a first DG and a curve 806 exhibits reactive output power for a second DG. Harmonic distortions added to a reference signal can lead to an emergence of resonance phenomena in the reactive output powers of the two separate DGs. Graph 802 is a sub-graph of graph 800 that highlights resonance phenomena occurring after 2.35 seconds for both DGs.

Thus, resonance phenomenon can emerge in output voltage at the PCC, in addition to output active and reactive power. This undesired effect took place after (2.5 seconds) from simulation run in real time, as illustrated in FIGS. 4 and 5, respectively.

The MG controller can avoid the resonance phenomenon. In the MG controller, $V_{ratio}$ multiplier can be disabled without influencing system response. An RCDC within the MG controller can already possess a branch for voltage regulation connected in parallel to an active current droop controller. The RCDC can enable voltage regulation during islanding.

Figure 8:
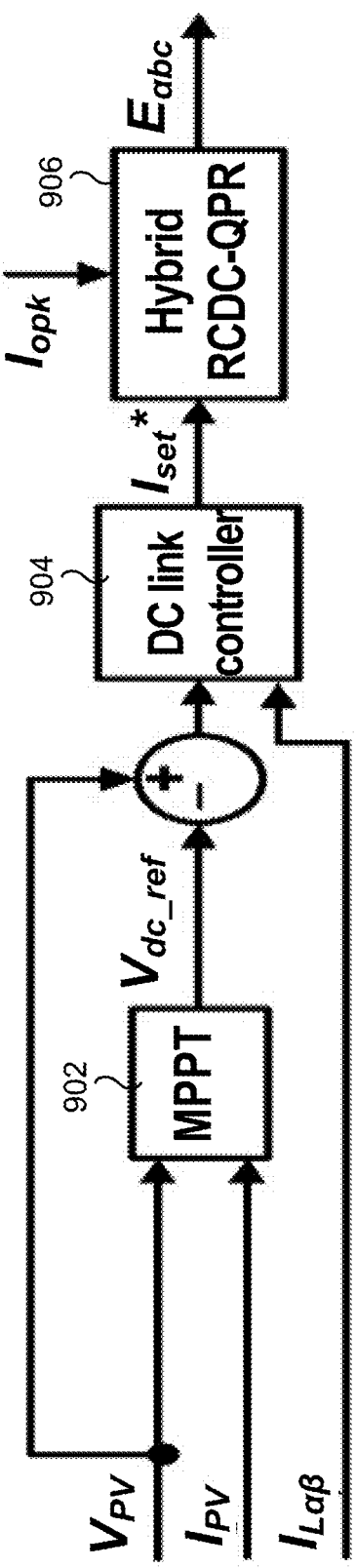
FIG. 8 is a schematic showing components for DC-link voltage regulation unit of a single stage PV multi-string inverter according to one example of the present application.

FIG. 8 is a schematic showing components for a DC-link voltage regulation unit of a single stage PV multi-string inverter according to one example of the present application. The DC-link voltage regulation unit can be a component of an MG controller. To incorporate a PV array with a unified CCM, instead of an ideal DC source, control at the DC-link side can be modified by two main regulating blocks, namely a P&O MPPT control system 902 and a DC-link voltage controller 904, as shown in FIG. 8. The P&O MPPT control system 902 may only be activated during GCM. Meanwhile, the P&O MPPT control system 902 can be halted during ISM, as the MG controller operates in power sharing mode, with the aid of load shedding, if needed.

Figure 9:
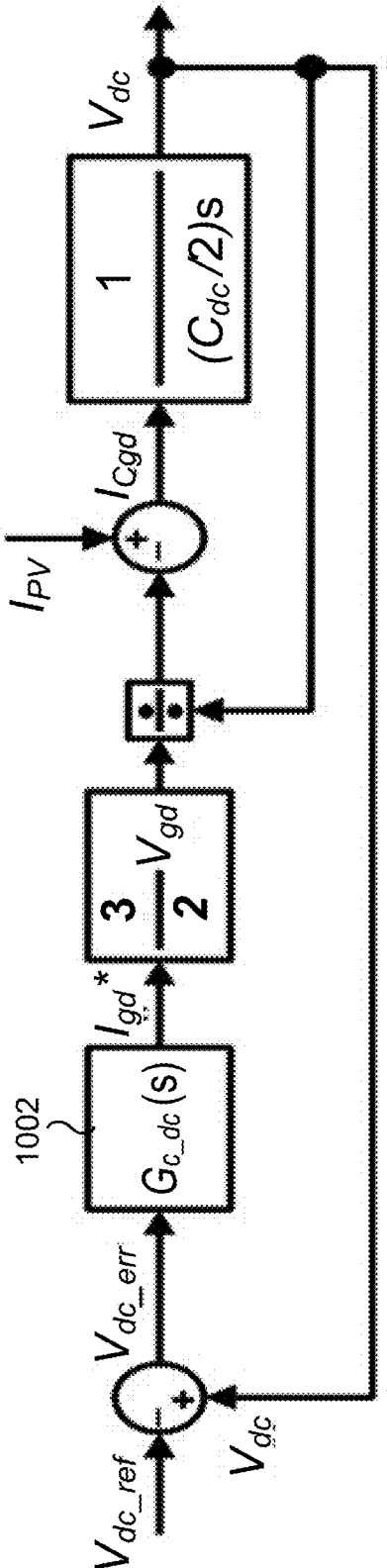
FIG. 9 is a schematic of a DC link voltage regulation unit according to one example of the present application.

Since the multi-string inverter can be directly coupled to the PV array, the MPPT algorithm can continuously change $V_{dc\_ref}$ in compliance with a tracked MPP voltage ($V_{mpp}$). Hence, a new $V_{dc\_ref}$ determined by the P&O MPPT control system 902 can be reflected in a magnitude of the AC current setpoint $I_{set}^*$ for controlling exchanged power with a main grid. A proportional integral (PI) voltage controller can be employed to regulate a voltage error detected between an operating voltage of the PV array ($V_{PV}$) and $V_{dc\_ref}$, thus $I_{set}^*$ can be generated accordingly. The DC-link voltage ($V_{dc}$) can be pushed towards $V_{mpp}$ without using an intermediate power circuit for MPP extraction. The DC-link voltage regulation unit can be remarkably simplified in single stage topology, as shown in FIG. 9.

For tuning DC-link control parameters, a following system model can be designated. Considering a balanced stiff grid with fixed frequency 50 Hz at a steady state, e.g., no phase angle change ($V_{gq}$=0), power exported to the main grid can be defined as follows;

$$P_{grid} = \frac{3}{2}\left(V_{gd}I_{gd} + \underbrace{V_{gq}I_{gq}}_{\approx 0}\right) = \frac{3}{2}V_{gd}I_{gd} \tag{2}$$

where $V_{gd}$, $V_{gq}$, $I_{gd}$, $I_{gq}$ are the direct and quadrature axes of main grid voltage and current, respectively. Hence, dissipated power at a DC-link capacitor $P_{Cap}$ can be given as;

$$P_{Cap} = P_{PV} - P_{grid}$$

where $P_{PV}$ is an output power of the PV array. Thus, $$\frac{C_{dc}}{2}sV_{dc} \times V_{dc} = \left(V_{dc}I_{PV} - \frac{3}{2}(V_{gd}I_{gd})\right) \tag{4}$$

$$V_{dc} = \frac{1}{C_{dc}/2\ s}\left(I_{PV} - \frac{3}{2}\frac{(V_{gd}I_{gd})}{V_{dc}}\right) \tag{5}$$

FIG. 9 is a schematic of a DC link voltage controller 1000 according to one example of the present application. In some examples, the DC link voltage controller 1000 can be identical to DC link voltage controller 904 in FIG. 8. From (5), a schematic shown in FIG. 9 is derived for DC-link voltage regulation, where $G_{c\_dc}$ (s) 1002 is a PI voltage controller used to compare a DC-link voltage $V_{dc}$ fed by a PV array against a reference DC-link voltage $V_{dc\_ref}$. According to a voltage error, a magnitude of an AC current set point $I_{set}^*$ (equivalent to $I_{gd}^*$) is varied as per (6) until a DC-link voltage becomes regulated at the designated reference DC-link voltage $V_{dc\_ref}$.

$$I_{set}^* = V_{dc\_err} \cdot G_{cdc}(s) = \times k_{pdc}\left(1 + \frac{k_{idc}}{s}\right) \tag{6}$$

where $k_{pdc}$ and $k_{idc}$ are proportional and integral gains of the DC-link voltage controller 1000. Note that $I_{set}^*$ or ($I_{gd}^*$) can be calculated independently of inverter output impedance or grid voltage, as $I_{set}^*$ only changes based on DC-link voltage error (i.e., PV power changes). Meanwhile, power sharing accuracy can be guaranteed through RCDC-QPR hybrid control.

Based on a control model depicted in FIG. 9, PI coefficients can be tuned using a Ziegler-Nichols method. By driving a system to oscillatory response, two parameters can be captured, namely $K_{cr}$ and $T_{cr}$, which are critical gain and time period of an oscillatory cycle. Accordingly, the two parameters, $k_{pdc}$ and $k_{idc}$, can be set equal to (0.4×$K_{cr}$) and (1.2/$T_{cr}$), respectively as will be demonstrated later in Table I.

Figures 10A, 10B:
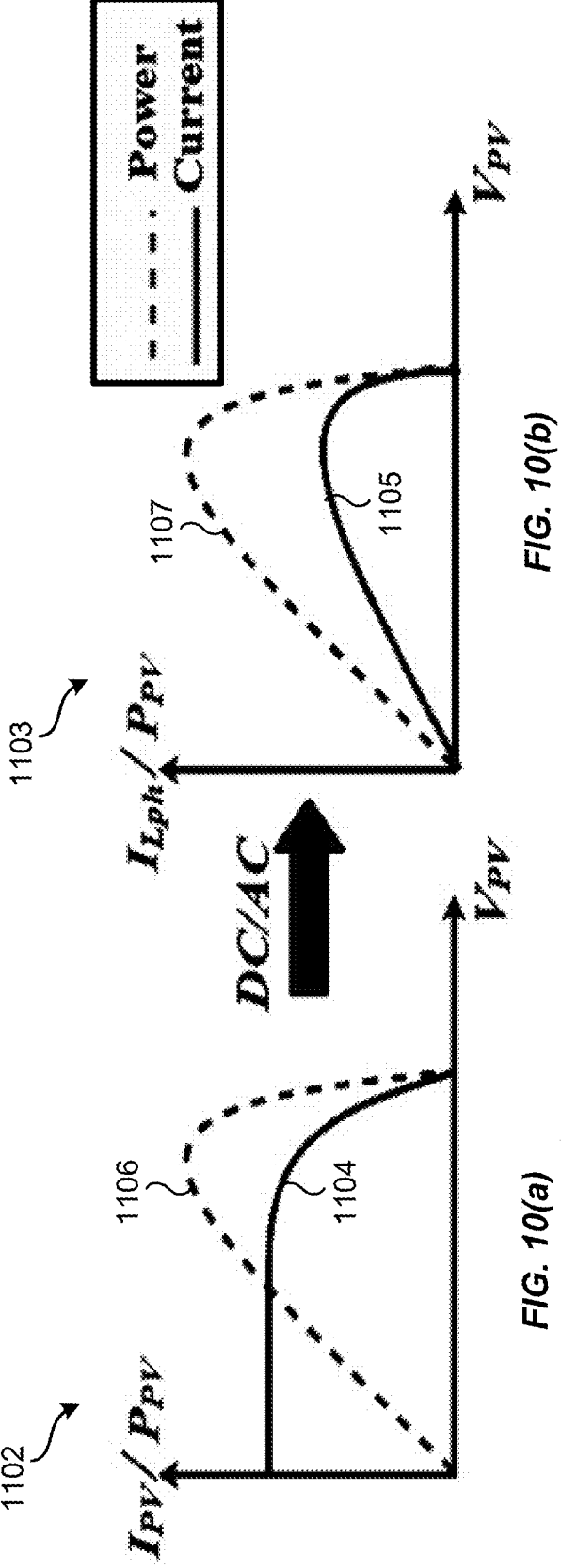
FIG. 10(a) is a graph depicting I-V and P-V characteristic curves for a PV array based on DC current measurements according to one example of the present application.
FIG. 10(b) is a graph depicting I-V and P-V characteristic curves for a PV array based on AC current measurements according to one example of the present application.

In previous studies, MPPT has been addressed through measuring PV power at a DC-link side. In the present application, MPPT can be handled directly through AC side measurements, especially with single-stage PV-inverter topology. In this section, AC current measured at the AC side is directly employed to track MPP. To understand this form of tracking the MPP, consider the following relations.

$$P_{inv} = P_{PV} - P_{loss} \tag{7}$$

$$I_{Lph} = \frac{P_{inv}}{\sqrt{3}\ V_{LLrms}\cos(-\theta_i)} \approx \frac{V_{PV} \times I_{PV}}{\sqrt{3}\ V_{LLrms}\cos(-\theta_i)} \tag{8}$$

where, $P_{inv}$ is an inverter output power, $P_{PV}$ is input PV power, $P_{loss}$ is system power losses, $I_{Lph}$ is an inverter's phase current passing through an LC filter inductor, and $V_{LLrsm}$ is line rms voltage. From (8), assuming that power losses are negligible, in addition to constant grid voltage, a linear relation can be found between $I_{Lph}$ and $V_{PV}$. Accordingly, I-V and P-V characteristics of a PV module can be recognized from both DC and AC side measurements as depicted in FIGS. 10(a) and (b), respectively. FIG. 10(a) is a graph 1102 depicting I-V 1104 and P-V 1106 characteristic curves for a PV array based on DC current measurements according to one example of the present application. The I-V characteristic curve 1104 shows a dependence of PV array output current $I_{PV}$ on the PV array output Voltage $V_{PV}$ based on the DC current measurements. The P-V characteristic curve 1106 shows a dependence of output power of the PV array $P_{PV}$ on the PV array output Voltage $V_{PV}$ based on the DC current measurements. The curves shown in FIG. 10(a) are those measured at the DC-side, which have been normally used for finding MPPT in previous studies.

FIG. 10(b) is a graph 1103 depicting I-V 1105 and P-V 1107 characteristic curves for the PV array based on AC current measurements according to one example of the present application. The I-V characteristic curve 1105 shows a dependence of the inverter's phase current $I_{Lph}$ on the PV array output Voltage $V_{PV}$ based on AC current measurements. The P-V characteristic curve 1107 shows a dependence of output power of the PV array $P_{PV}$ on the PV array output Voltage $V_{PV}$ based on the AC current measurements. Using the AC current measurements, FIG. 10(*b*) shows that both curves ($I_{Lph}$ vs. $V_{PV}$) and ($P_{PV}$ vs. $V_{PV}$) can be linearly related. These linear relationships can emphasize a feasibility of using the measured AC current (inverter side) for tracking the MPP directly. The system can track MPP by only monitoring the AC current, which is already measured across LC filter inductance as a component of a MG controller. Thus, as long as the measured AC current is increased, a DC reference voltage, $V_{dc\_ref}$ can be perturbed in the same direction by a P&O algorithm either by an increase or decrease for tracking the MPP. Hence, a DC-link voltage controller can alter a magnitude of an inverter's AC current setpoint $I_{set}*$ until a voltage error between the perturbed voltage reference ($V_{dc\_ref}$) and the PV array operating voltage ($V_{PV}$) is eliminated. $I_{set}*$ can be fed to a RCDC-QPR controller to manage power flow and power sharing accordingly.

Figure 11:
FIG. 11 is a flow chart of a conventional process for regulating a DC voltage output of a PV array based on DC current measurements.

FIG. 11 is a flowchart of a conventional process 1200 for regulating a DC voltage output of a PV array based on DC current measurements. The process 1200 starts at block 1202. At block 1204, a present measurement of a PV array voltage, $V_{PV}$, and PV array current, $I_{PV}$, can be made. At block 1206, a present value for power of the PV array, $P_{PV}$, can be determined by taking a product of the present PV array voltage and present PV array current: $P_{PV}(n)= V_{PV}(n) \cdot I_{PV}(n)$. At block 1208, an incremental change in the PV array power, $dP_{PV}$, can be detected. The incremental change in PV array power can be found by taking a difference between the present value for the PV array power, $P_{PV}(n)$, and a previous value for the PV array power, $P_{PV}(n-1)$.

At block 1210, a determination can be made regarding the incremental chage in the PV array power. If the incremental change, $dP_{PV}$, is positive, the process 1200 can continue to block 1212. At block 1212, a determination regarding an incremental change in the PV array voltage, $dV_{PV}=V_{PV}(n)- V_{PV}(n-1)$, can be made. If the incremental change, $dV_{PV}$, is positive, the process 1200 can continue to block 1214. At block 1214, a DC reference voltage, $V_{dc\_ref}$ can be increased. If the incremental change, $dV_{PV}$, is positive, the process 1200 can continue to block 1216. At block 1216, the DC reference voltage, $V_{dc\_ref}$ can be decreased.

Returning to block 1210, if the incremental change, $dP_{PV}$, is not positive, the process can continue to block 1218. At block 1218, a determination regarding an incremental change in the PV array voltage, $dV_{PV}=V_{PV}(n)-V_{PV}(n-1)$, can be made. If the incremental change, $dV_{PV}$, is positive, the process 1200 can continue to block 1220. At block 1220, the DC reference voltage, $V_{dc\_ref}$ can be decreased. If the incremental change, $dV_{PV}$, is not positive, the process 1200 can continue to block 1222. At block 1222, the DC reference voltage, $V_{dc\_ref}$ can be increased. Blocks 1220, 1222, 1216, and 1214 all continue to block 1224. At block 1224, DC voltage can be regulated so that the present value for the power of the PV array can be set equal to the previous value of the power of the PV array. The process 1200 can continue to 1226. At block 1226, the process 1200 can return to the start at block 1202.

Figure 12:
FIG. 12 is a flow chart of a process for regulating a DC voltage output of a PV array based on AC current measurements according to one example of the present application.

FIG. 12 is a flowchart of a process 1300 for regulating a DC voltage output of a PV array by a MG controller based on AC current measurements according to one example of the present application. The process 1300 starts at block 1302. At block 1304, the process 1300 can involve measuring a present value for a rms phase current, $I_{Lph}$, of a VSI. In some examples, the rms phase current can be measured using a single AC current sensor. At block 1306, an incremental change in rms phase phase current, $dI_{Lph}$, can be detected. The incremental change in the rms phase current can be found by taking a difference between the present value for the rms phase current, $I_{Lph}(n)$, and a previous value for the rms phase current, $I_{Lph}(n-1)$.

At block 1308, a first determination can be made regarding the incremental change in the rms phase current. If the incremental change, $dI_{Lph}$, is zero, the process 1300 can continue to block 1316. At block 1316, the present value of the rms phase current can be equivalent to the previous value of the rms phase current. If the incremental change, $dI_{Lph}$, is nonzero, the process 1300 can continue to block 1310.

At block 1310, a second determination can be made regarding the incremental change in the rms phase current. If the incremental change, $dI_{Lph}$, is positive, the process 1300 can continue to block 1312. At block 1312, a DC reference voltage, $V_{dc\_ref}$ can be increased. Returning to block 1310, if the incremental change, $dI_{Lph}$, is negative, the process 1300 can continue to block 1314. At block 1314, the DC reference voltage, $V_{dc\_ref}$ can be decreased. The process 1300 can continue to block 1316 (which has been described above) from both block 1312 and block 1314. From block 1316, the process 1300 can continue to block 1318. At block 1318, the process 1318 can return to the start at block 1302.

Based on a comparison of processes in FIG. 11 and FIG. 12, less steps and determinations can be made in process 1300 than in conventional process 1200. The process 1300 for regulating a DC voltage output of a PV array by a MG controller based on AC current measurements can take less computing power than the conventional process 1200 that can be based on DC current measurements.

A current amplitude set-point $I_{set}*$ readjustment to zero within a droop equation may not be mandatory upon sudden islanding with the MG controller as opposed to conventional VCM based droop methods. The RCDC of the MG controller can freely accept any setpoint value ranged between 0 to $I_{rated}$ during ISM, while maintaining proportional power sharing among parallel DGs. Thus, a last current setpoint value determined by the MPPT prior to islanding can be directly used without affecting the power sharing accuracy. On the contrary, conventional VCM based approaches can require islanding detection so that the current setpoint can be set to zero when islanding takes place.

A PLL-less SSM control scheme can be integrated within the MG controller to offer better control flexibility for an integration of PV multi-string inverters to a main grid. The PLL-less SSM control scheme can be extended to systems designed to provide load sharing between unequally rated inverters. A quantitative analysis is included to give general guidelines for tuning the PLL-less SSM control scheme more accurately using QPR regulator.

Figures 13A, 13B:
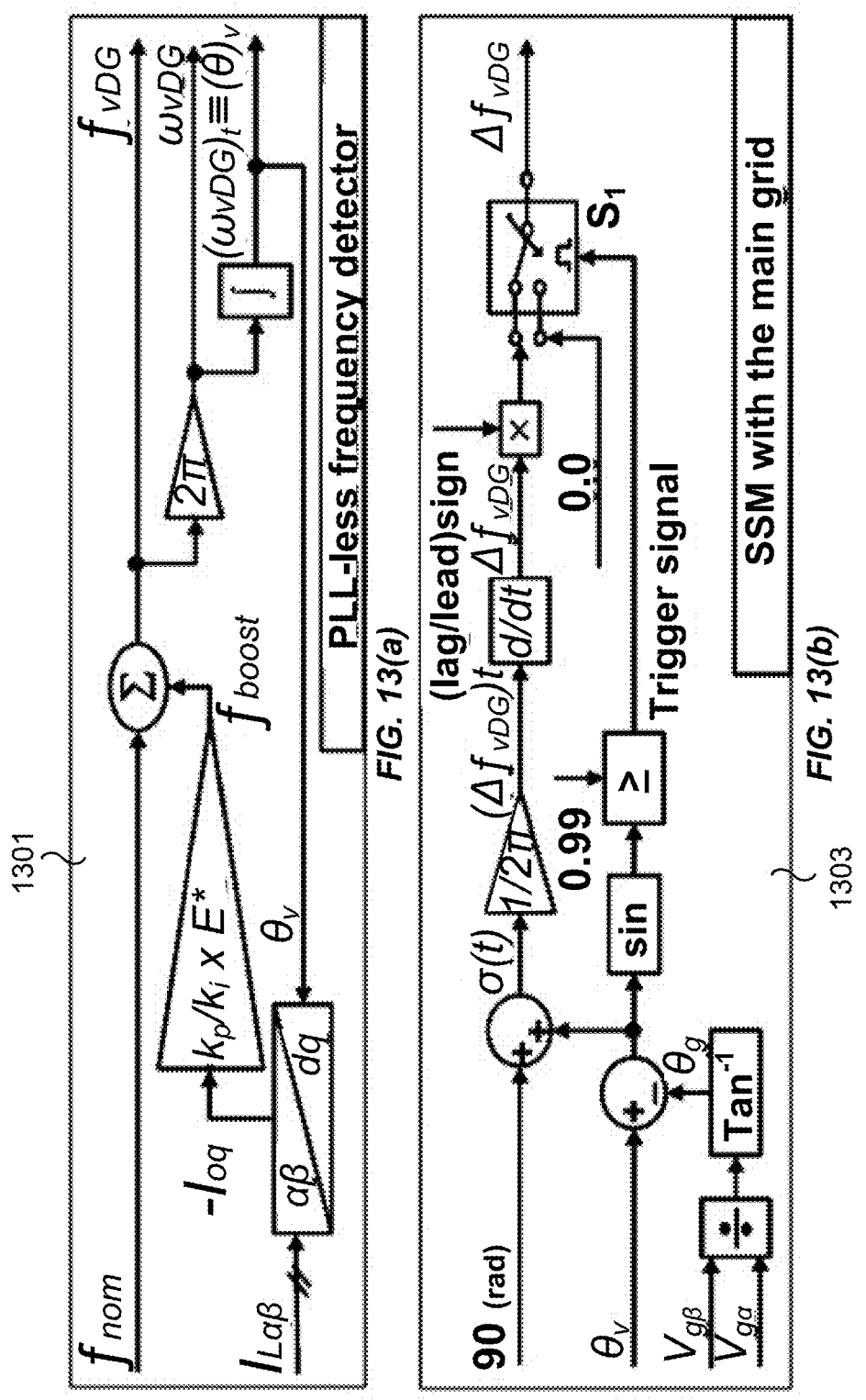
FIG. 13(a) is a schematic of a PLL-less frequency detector for a PLL-less SSM control scheme according to one examples of the present application.
FIG. 13(b) is a schematic of a PLL-less SSM for a PLL-less SSM control scheme according to one example of the present application.

The PLL-less SSM control scheme can be realized through two main blocks as shown in FIG. 13 (*a*) and (*b*), respectively. FIG. 13(*a*) is a schematic of a PLL-less frequency detector 1301 for a PLL-less SSM control scheme according to one examples of the present application. FIG. 13(*b*) is a schematic of a PLL-less SSM 1303 for a PLL-less SSM control scheme according to one example of the present application. The outputs of the PLL-less frequency detector 1301 and the PLL-less SSM 1303 can yield a frequency of inverter's output voltage ($f_{vDG}$), and a time varying frequency change ($\Delta f_{vDG}$), which can be set tem-

15

16 porarily until an inverter output current and grid voltage become synchronized. FIG. 13 (*a*) shows that intrinsic droop characteristics of an inner QPR regulator can be directly exploited to obtain $f_{vDG}$. Hence, the PLL-less frequency detector 1301 can be attained instead of a conventionally used PLL.

Figure 14:
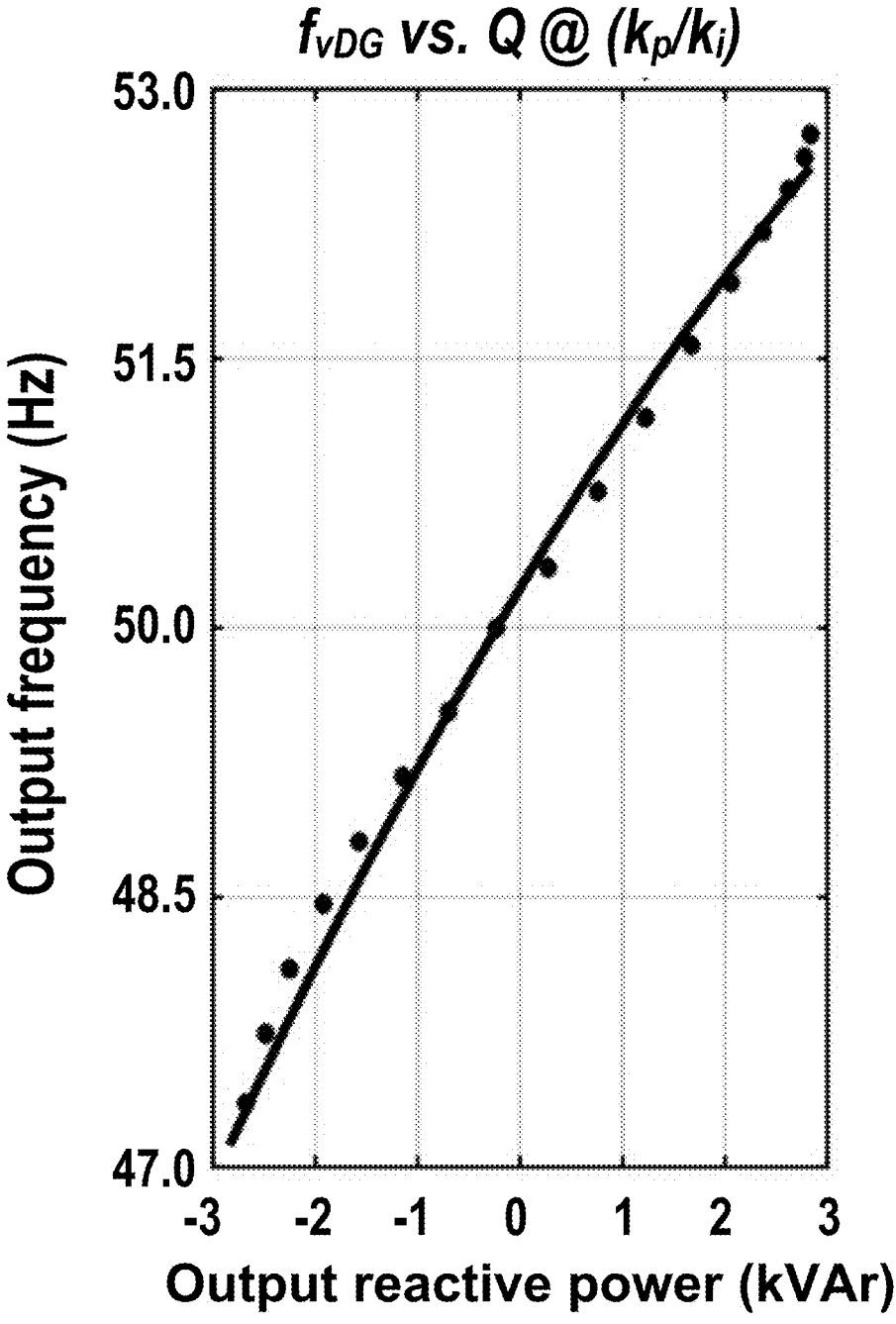
FIG. 14 is a graph depicting an output frequency of a current-controlled voltage source inverter (CCVSI) versus reactive load within a range ±3.0 kVAr under a boost ratio of $k_p/k_i$ according to one example of the present application.
Figure 15:
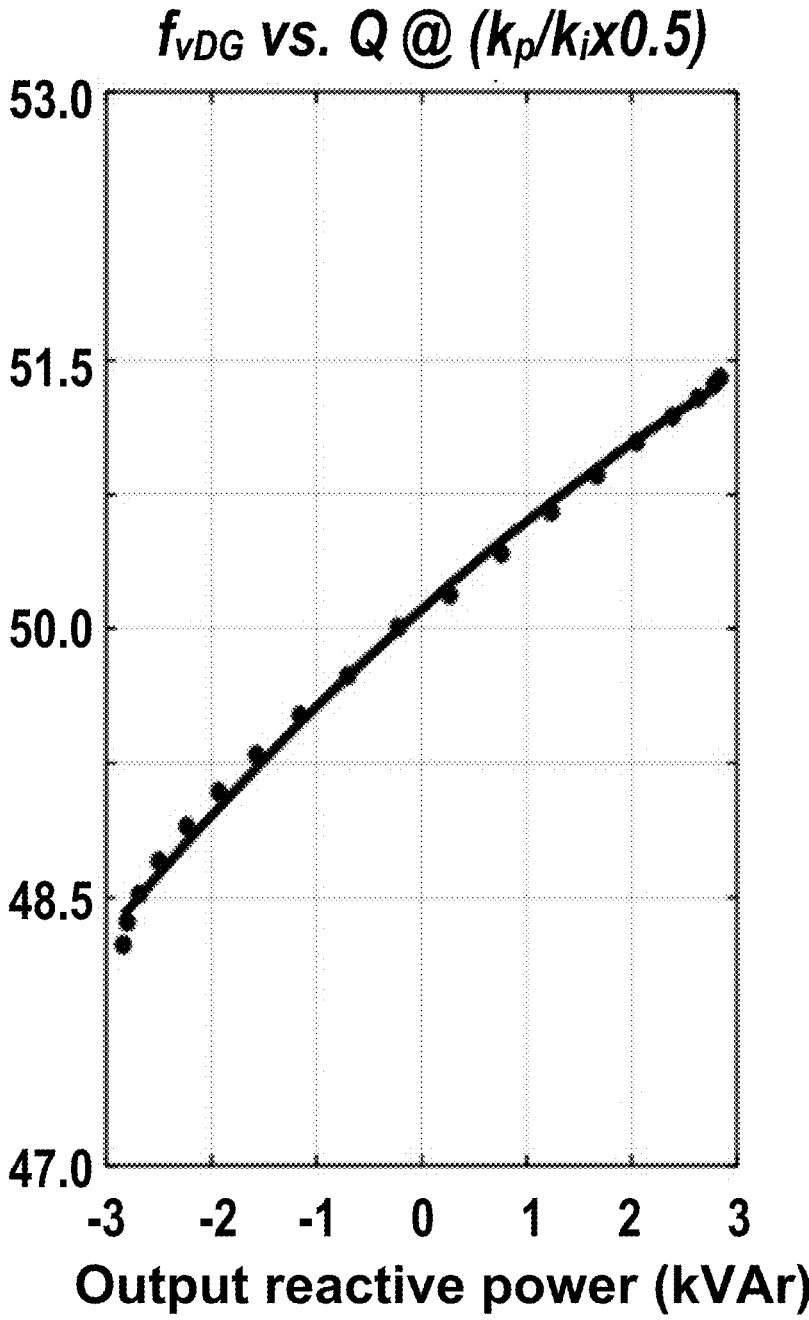
FIG. 15 is a graph depicting an output frequency of CCVSI versus reactive load within a range ±3.0 kVAr under a boost ratio of 0.5 $k_p/k_i$ according to one example of the present application.
Figure 16:
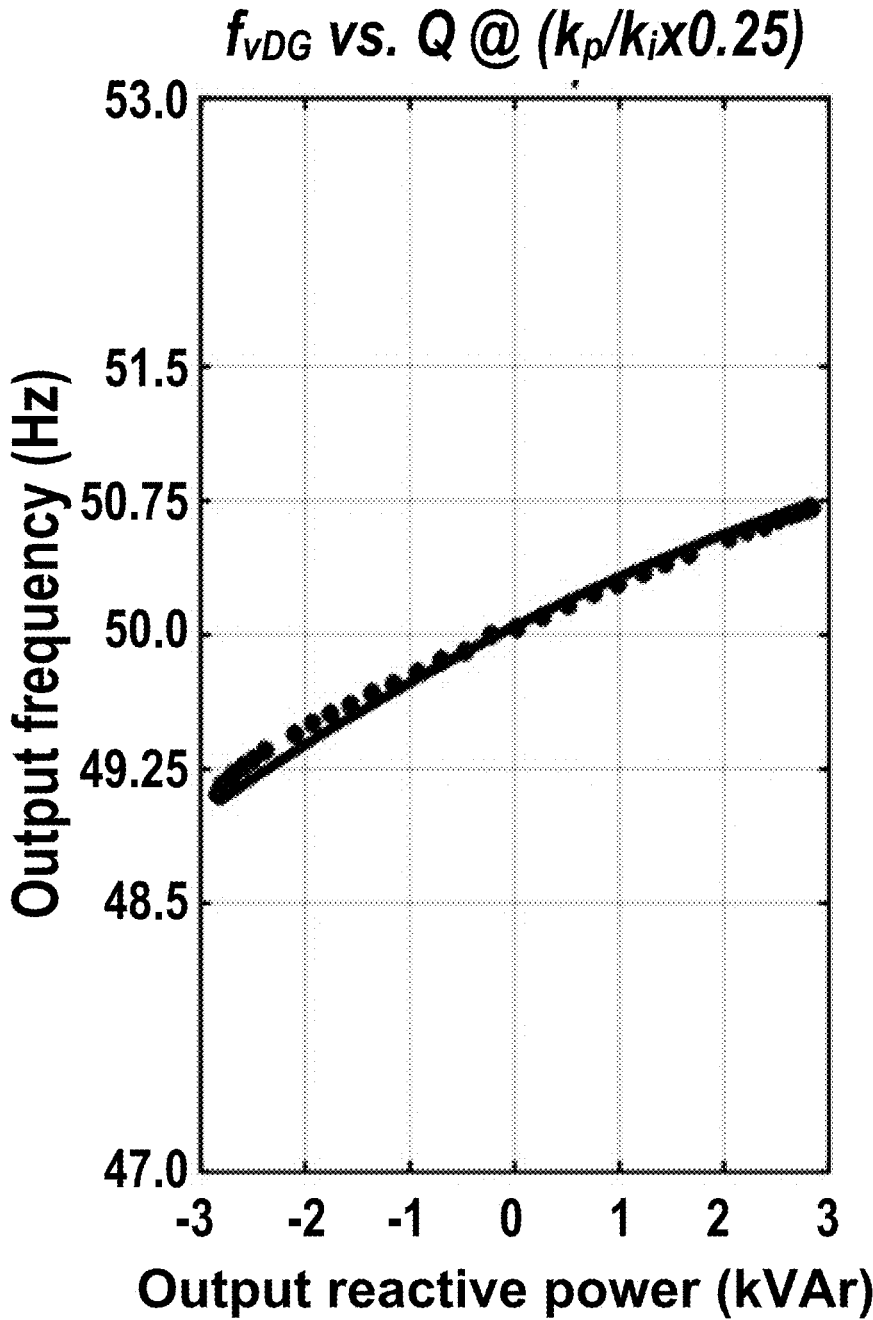
FIG. 16 is a graph depicting an output frequency of CCVSI versus reactive load within a range ±3.0 kVAr under a boost ratio of 0.25 $k_p/k_i$ according to one example of the present application.

Using control parameters shown later in Table I, while considering varied reactive loading conditions between (±3.0 kVAr), linear fitted curves shown in FIGS. 14-16 can yield an approximately linear relation between an inverter's output reactive power (Q) and frequency, as defined in (9) for parallel CCVSIs.

$$f_{vDG} = f_{nom} + \frac{\Delta f}{\Delta Q} \times Q, \text{ where } \frac{\Delta f}{\Delta Q} \equiv \frac{k_p}{k_i} \quad (9)$$

The slope of each linearized curve ($\Delta f/\Delta Q$) represents a frequency boost ratio. Noticeably, the latter can be equal to a proportional gain over resonant gain ratio ($k_p/k_i$) belonging to an inner QPR regulator, as inferred from FIGS. 14-16. FIG. 14 is a graph depicting an output frequency of CCVSI versus reactive load within a range ±3.0 kVAr under a boost ratio of $k_p/k_i$ according to one example of the present application. FIG. 15 is a graph depicting an output frequency of CCVSI versus reactive load within a range ±3.0 kVAr under a boost ratio of 0.5 $k_p/k_i$ according to one example of the present application. FIG. 16 is a graph depicting an output frequency of CCVSI versus reactive load within a range ±3.0 kVAr under a boost ratio of 0.25 $k_p/k_i$ according to one example of the present application.

The proportional gain over the resonant gain can be responsible for shaping a relation between Q vs. $f_{vDG}$. Gain $k_p$ can determine a maximum frequency deviation from a nominal value $f_{nom}$, whereas $k_i$ can influence a frequency rate of change corresponding to reactive load variations. Hence, a lower $k_p/k_i$ ratio can lead to a reduced frequency deviation. Additionally, the slope of the linearized curve can be matched to the ratio $k_p/k_i$, as depicted in FIG. 14-16. Therefore, the proportional gain over resonant gain ratio can be directly used as a frequency boost ratio:

$$f_{vDG} = f_{nom} + \left(\frac{k_p}{k_i}\right)(-E^* I_{oq}) \quad (10)$$

where, $V_{od}$, $V_{oq}$ are direct and quadrature axes of output voltage. Noting that $V_{oq}$ can equal zero when frequency is maintained at the steady state. $I_{oq}$ can represent quadrature axis current intrinsically controlled by the QPR regulator. $E^*$ can represent nominal voltage magnitude substituting $V_{od}$ since voltage can be regulated by an RCDC at the nominal value.

Figure 17:
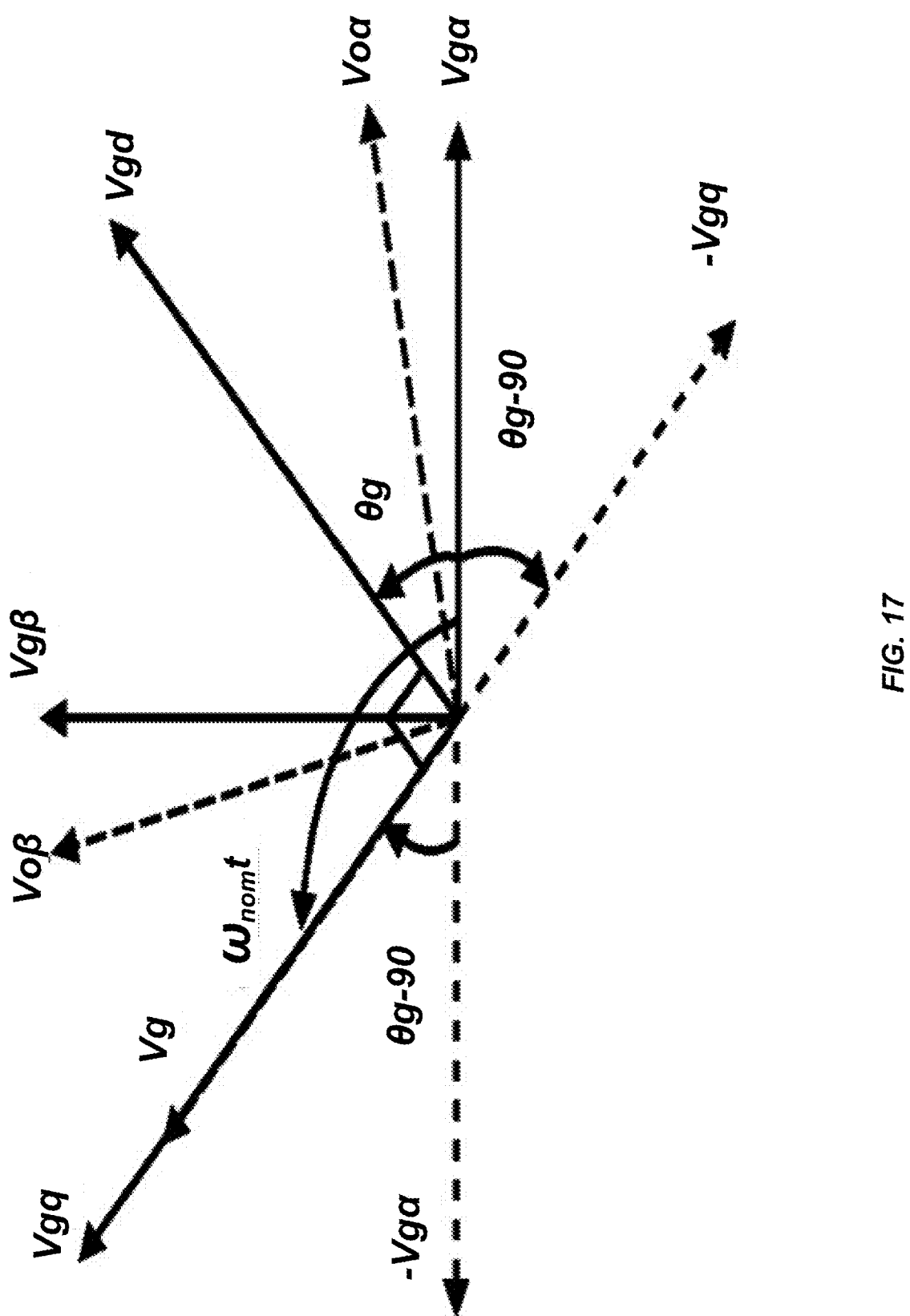
FIG. 17 is a schematic of a phasor diagram associated with a grid voltage transformation from αβ-STF to dq-SRF according to one example of the present application.

A quantitative analysis described above can give basic guidelines for tuning a response of the PLL-less detector using the inner QPR regulator. Hence, a reference current angle can be made in phase with an inverter's output voltage, while controlling reactive droop characteristics and maximum frequency deviations. Upon transition to GCM, a voltage angle may not be mandatorily matched with that of a main grid as per a phasor diagram exhibited in FIG. 17. FIG. 17 is a schematic of a phasor diagram associated with a grid voltage transformation from αβ-STF to dq-SRF according to one example of the present application. As shown, a transformation from αβ stationary frame (αβ-STF) to dq synchronous reference frame (dq-SRF) can be implemented to evaluate a phase shift angle δ between an inverter voltage and the main grid's voltage, as per (11).

$$\delta = \omega_{vDG}t - \omega_{nom}t \quad (11)$$

where, $\omega_{vDG}$ and $\omega_{nom}$ are the inverter's output and nominal angular frequencies. Considering that, $\theta_g$ can be derived using an arctangent function denoted in (12)

$$\theta_g = \tan^{-1}(V_{g\beta}/V_{g\alpha}) \quad (12)$$

and, $$\omega_{nom}t = \theta_g + 90 \quad (13)$$

From (12) and (13), (11) can be rewritten as follows;

$$\delta = \omega_{vDG}t - \theta_g - 90 \quad (14)$$

Accordingly, the phase shift angle δ may be nullified at steady state in order to achieve synchronism, which sets out a following condition.

$$\begin{cases} \omega_{vDG}t - \theta_g = 90 \\ \sin(\omega_{vDG}t - \tan^{-1}(V_{g\beta}/V_{g\alpha})) = 1.0 \end{cases} \quad (15)$$

Figure 18:
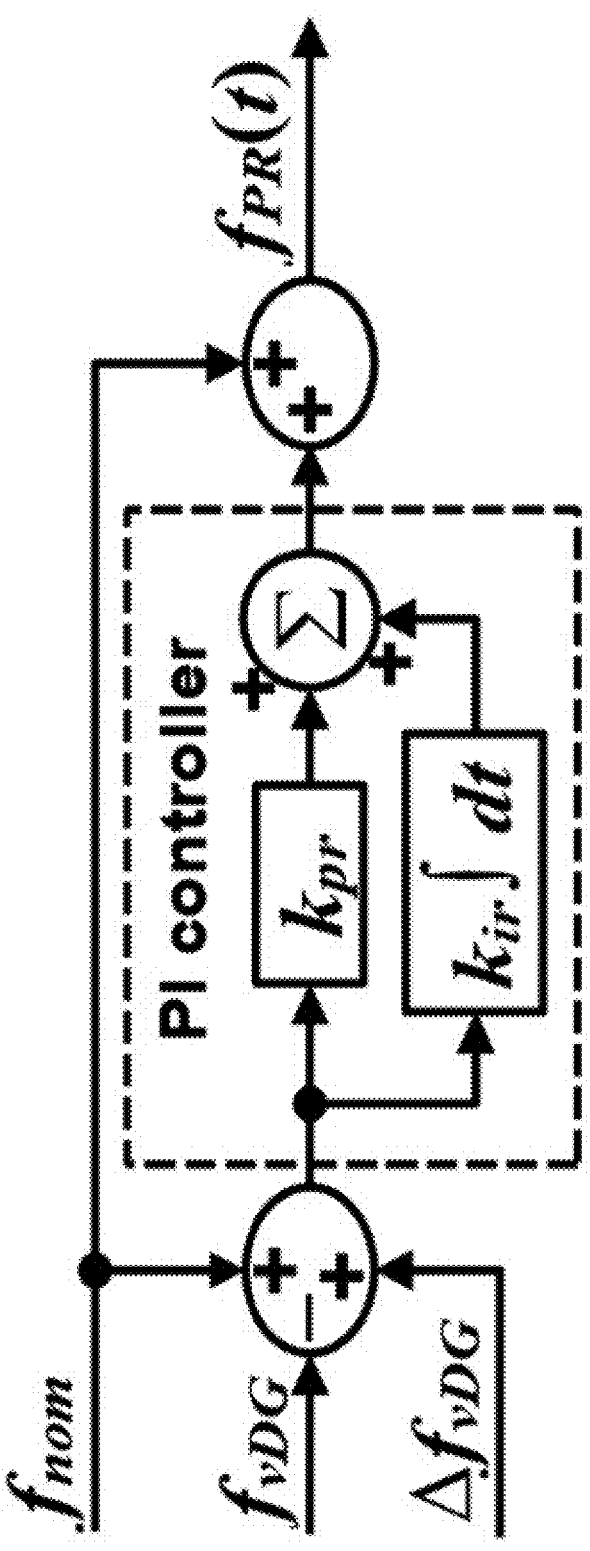
FIG. 18 is a schematic of a Frequency restoration block embedded with a PLL-less SSM unit according to one example of the present application.

To meet the condition associated with (15), an approach shown in FIG. 13 (*b*) can be implemented to eliminate a phase error by embedding a time varying frequency change ($\Delta f_{vDG}$) to the inverter for active synchronization with the main grid. A fast frequency restoration (FFRES) loop can be implemented as depicted in FIG. 18. FIG. 18 is a schematic of a Frequency restoration block embedded with a PLL-less SSM according to one example of the present application. During ISM, The FFRES loop can restore the frequency $f_{vDG}$ to a nominal value upon reactive load changes caused by a reactive boost droop of the QPR regulator. Meanwhile, the FFFRES loop can activate a gradual change $\Delta f_{vDG}$, upon transition to GCM. A parameter $\Delta f_{vDG}$ can remain activated until a synchronization condition defined in (15) is met, then the parameter $\Delta f_{vDG}$ can become nullified as indicated in FIG. 13 (*b*). Accordingly, information, e.g., output frequency $\Delta f_{vDG}$ and voltage phase angle $\theta_v$, can be obtained from a measured output reactive power depending on intrinsic droop attributes of a QPR regulator.

FIG. 19 is a flow chart of a process 1900 for controlling a plurality of DGs by a MG controller according to one example of the present application. Operations of processes may be performed by software, firmware, hardware, or a combination thereof. The operations of the process 1900 start at block 1910.

At block 1910, the process 1900 involves sharing power proportionally between the plurality of DGs based on a power capacity for each DG. Sharing the power proportionally can include regulating a reference current signal and providing, based on the reference current signal, a proportional active current shared between the plurality of DGs. The MG controller can include a power sharing unit. The power sharing unit can employ a unified current controlled approach or CCM for parallel VSIs of the plurality of DGs. The unified current controlled approach can hold many advantages over conventional controllers that use voltage control approaches. For example, the unified current controlled approach can produce an improved transient response compared to conventional control methods. Also, the power sharing unit can overcome or avoid transport delays, signal conditioning, and cumbersome mathematical calculations.

The power sharing unit can include a RCDC that can provide proportional active current sharing. The power sharing unit can also include a QPR regulator that can regulate a reference current signal and regulate sharing of a reactive current. The RCDC and QPR regulator can be coupled within a unified architecture operated in CCM. A predictive current estimator may be absent from the unified architecture. The unified architecture can support dual modes of operation (ISM/GCM), can exhibit a robustness against load fluctuations, can provide proportional sharing of P-Q output formula, and can use a universal droop formula suitable with a wide range of output impedance angles between $$-\frac{\pi}{2} \text{ to } +\frac{\pi}{2}.$$

The unified architecture can also be referred to as a unified RCDC-QPR controller.

The power sharing unit can be used with single-stage multi-string PV-inverter technology. The unified RCDC-QPR controller of the power sharing unit can overcome an inertia-nature of VSIs under various loading conditions. Inertia can be a technical term for describing an ability of a power system to resist changes when a disturbance occurs. The various loading conditions can include unintentional islanding, load fluctuations, or DC-link disturbances caused by an intermittent output power associated with PV sources. A power sharing accuracy of the power sharing unit can be unaffected by mismatched output impedances among parallel DGs during both ISM and GCM.

Conventional controllers can operate in VCM during GCM and CCM during ISM. Thus, conventional control methods can include islanding detection so that the conventional controller can switch from VCM to CCM when an operating mode switches from GCM to ISM. Islanding detection can lead to issues such as delays, complications, and transient mitigations. The power sharing unit can achieve a quick transition between GCM and ISM compared to conventional controllers since the power sharing unit can maintain a single CCM, meaning that the power sharing unit maintains CCM in both GCM and ISM. Islanding detection and issues associated with islanding detection can be avoided by the power sharing unit.

At block 1920, the process 1900 involves extracting a MPP for at least one PV array with a P&O algorithm. The MG controller can include a P&O MPPT control system as part of a DC-link voltage regulation unit. The P&O MPPT control system can extract the MPP to manipulate a power circuit output impedance until the output impedance matches a PV internal resistance at the MPP. The P&O algorithm employed by the P&O MPPT control system can rely on a voltage to power gradient ($dV_{PV}/dP_{PV}$) in tracking the MPP. The P&O algorithm can be a simple algorithm that can grant a satisfactory dynamic response. The P&O algorithm can also offer high tracking precision of the MPP even without prior knowledge of a mathematical model for the PV array. The P&O MPPT control system can operate without a readjustment of a current amplitude set-point to zero upon sudden islanding as opposed to conventional controllers that follow a VCM approach.

Extracting the MPP can be based on an AC current measurement by a single current sensor. Thus, a design of the DC-link voltage regulation unit can eliminate elements at a DC-link side of an MG that may be included in conventional control systems. Examples of the elements at the DC-link side include additional current sensors, signal conditioning, delays associated with the signal conditioning, and power calculations. The single current sensor can have a relatively low power rating. For example, the power rating of the single current sensor can be at least one third of a power rating for at least one single-stage PV inverter associated with the PV arrays. The tracking of the MPP can be achieved under varied insolation and temperature levels, while showing good dynamic response with minor perturbations.

At block 1930, the process 1900 involves regulating, based at least in part on the MPP, an output voltage for at least one of the PV arrays. The DC-link voltage regulation unit of the MG controller can include a DC-link voltage controller that can regulate the output voltage. The DC-link voltage regulation unit can be applied to single-stage PV inverters and regulate DC-link voltage without affecting a unified control architecture of the power sharing unit of the MG controller. The DC-link voltage regulation unit can include a compromise between MPPT sampling rate and incremental step voltage in order to achieve an optimized performance with minimal oscillations.

At block 1940, the process 1900 involves obtaining a reference frequency from an output current measurement. The reference frequency can be readily detected during both modes (GCM or ISM) in a PLL-less manner. The MG controller can include a PLL-less SSM control scheme. The PLL-less SSM control scheme can include a PLL-less frequency detector as a component. Depending on an output reactive current measured locally, frequency information can be efficiently detected. The PLL-less SSM control scheme can exploit the droop function to obtain a reference frequency, thus acquiring voltage angle information for synchronization without using a dedicated PLL.

At block 1950, the process 1900 involves performing, based on the reference frequency, active synchronization with a main grid. The PLL-less control scheme can also include a a PLL-less SSM unit for performing the synchronization. The PLL-less SSM control scheme can incorporate parallel inverters into the MG during both ISM and GCM without using a dedicated synchronization unit. The active synchronization method employed by the PLL-less SSM control scheme can achieve active synchronization with the main grid within less than three fundamental cycles under different lag/lead scenarios between an output voltage of the inverter and the main grid. The PLL-less SSM unit can be extended on the RCDC instead of a VCM based droop.

EXAMPLES

Figure 20:
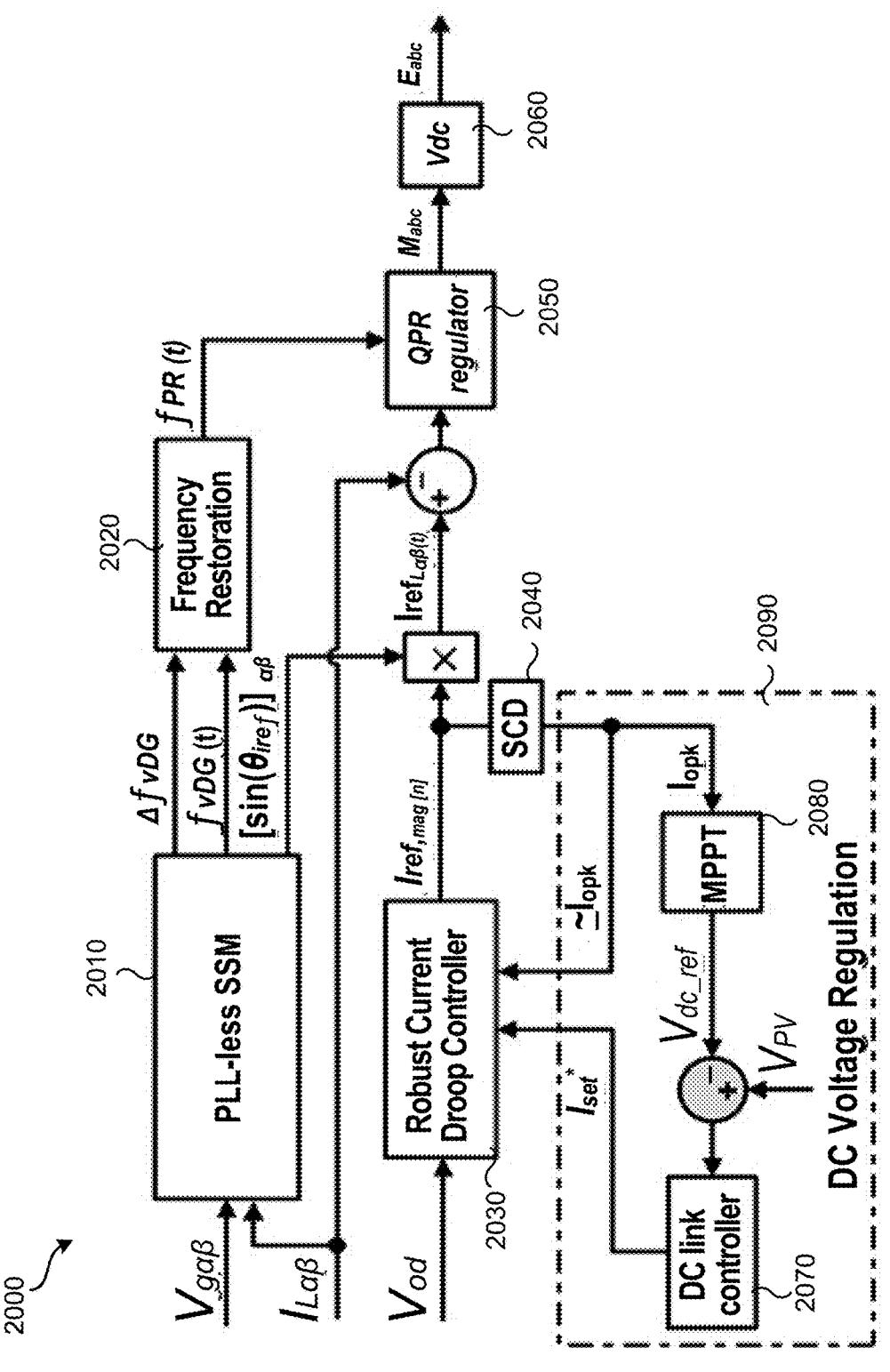
FIG. 20 is a schematic of a MG controller using an P&O MPPT control unit (with single input) and a PLL-less SSM unit for a single stage multi-string PV-inverter modeled with a RTS according to one example of the present application.

System performance of an MG controller can be validated using a real time simulation (RTS) during both ISM and GCM with random switching between two modes. FIG. 20 is a schematic of a MG controller using a P&O MPPT control unit (with single input) and a PLL-less SSM unit for a single stage multi-string PV-inverter modeled with a RTS according to one example of the present application. Components of the MG controller shown in FIG. 20 include a PLL-less SSM unit 2010, a frequency restoration unit 2020, an RCDC 2030, a sampling control delay (SCD) 2040, a QPR regulator 2050, a DC-link voltage 2060, and components of a DC-link voltage regulation unit 2090. The components of the DC-link voltage regulation unit 2090 include a DC-link controller 2070 and a P&O MPPT control system 2080. Aspects of the RTS include an MG formed from two PV arrays rated as (15 kW) and (7.5 kW) at standard test conditions (STC). Each of the two PV arrays are assigned as a main source of $DG_1$ and $DG_2$, while feeding two parallel CCVSI with maximum ratings equal to 20 kVA and 10 kVA, respectively. A fixed time step solver is employed for RTS with a sampling rate ($f_s$=10 kHz). Hence, an incremental step voltage of a P&O MPPT unit is relegated to ($V_{step}$=0.00025) in compromise with a RTS sampling rate to avoid large perturbations in system output. Other network and control system parameters are listed in Table I. Note that each PV array can consist of a specific number of parallel and series strings as indicated in Table II. Parameters are employed together for executing RTS scenarios which are illustrated in Table III.

Figure 21:
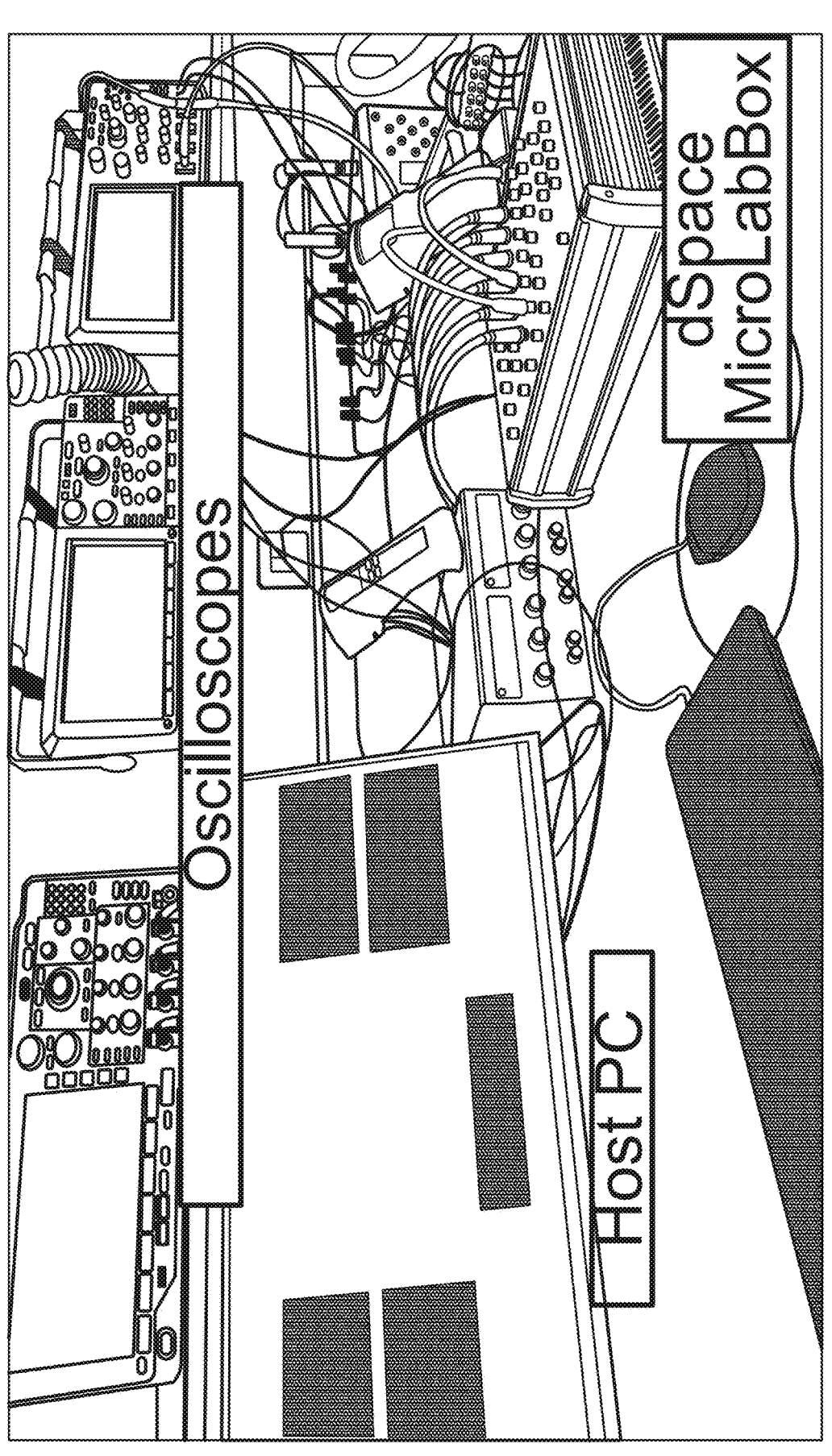
FIG. 21 is a photograph of a laboratory set up for carrying out a RTS of an MG controller according to one example of the present application.

Hardware used in the simulation includes dSPACE MicroLabBox. In addition, a graphical user interface (GUI) is created using ControlDesk software that is installed on a host PC. The GUI can set and modify an MG operating mode and PV climatic conditions by a user during simulation run in real time, while exporting feedback results to an external Digital Storage Oscilloscope (DSO) through real time simulator output ports. A general layout of the RTS laboratory mounting is depicted in FIG. 21. FIG. 21 is a photograph of a laboratory set up for carrying out a RTS of an MG controller according to one example of the present application.

As delineated in Table III, a RTS scenario commences with an operation of PV inverters in ISM. Two parallel PV-inverters proportionally share common loads as indicated. In the RTS scenario, the PV-arrays are initially exposed to STC at uniform irradiance and temperature levels, namely 1000 W/m2 and 25° C., respectively. Loading conditions are abruptly doubled from (6+2j kVA) to (12+4j kVA) after two seconds from a start of the RTS. Then, during a time period (from 4 to 16 second), a main grid is switched into service alongside with the MG. Hence, the PV-inverters share active load currents proportionally, while injecting excess energy to the main grid at unity power factor. The main grid can compensate any supply shortage within the MG below load demands.

Another part of the simulation scenario is activated during GCM by varying ambient climatic conditions subjected to the PV arrays. In this sense, an insolation level is varied between (1000-300-800) W/m2 during three time intervals (4-8, 8-12, and 12-16 seconds). The ambient temperature is manipulated through a ramp function with a slew rate (±5° C. per second) and increased gradually from 25 to 30° C. during the time period of 12-16 seconds. Concurrently, a loading condition is also varied during GCM by disconnecting common loads during the time interval of 4-8 seconds, while different loading values equivalent to (12+4j kVA) and (6+2j kVA) are activated during the simulation period during 8-12 and 12-16 seconds intervals, respectively. After 16 seconds, the PV arrays remain exposed to 800 W/m2 and 30° C., while a sudden islanding is provoked, thus the common loads become entirely supplied by the MG. More intensely, an additional transient is considered by having the common loads doubled at the same instant of this abrupt islanding.

TABLE I

NETWORK AND CONTROL SYSTEM PARAMETERS.

| Parameter | Description | Value |
|---|---|---|
| $Z_{line1}/Z_{line2}$ | Line impedance of $DG_{1, 2}$ ($\Omega$) | 0.5 + j0.0658/ 0.25 + j 0.0329 |
| $S_{rated1}/S_{rated2}$ | Rated power of $DG_{1, 2}$ (kVA) | 12.0/6.0 |
| $V_{line}/f_{nom}$ | Nominal line voltage and frequency | 380 V/50 Hz |
| $V_{dc\_min}$ | Minimum DC-link voltage | 600 V |
| $L_{f1, 2}/C_{f1, 2}$ | LC inductor and capacitor in $DG_{1, 2}$ | 4 mH/5 µF |
| $\omega_c$ | Angular cut-off frequency of QPR | $2\pi \times 4$ rad/sec |
| $k_{p1, 2}$ | Proportional gain of QPR | 0.0233 |

TABLE I-continued

NETWORK AND CONTROL SYSTEM PARAMETERS.

| Parameter | Description | Value |
|---|---|---|
| $K_{i1, 2}$ | Resonant gain of QPR | 3.7037 |
| $K_{e1, 2}$ | Voltage error gain of RCDC | 0.5 |
| $m_{p1, 2}$ | Active current droop gain of RCDC | 0.1815 |
| $K_{pr1, 2}/K_{ir1, 2}$ | PI gains of the FFRES | 5/300 |
| $T_s$ | RTS sampling period | 100 µs |
| $V_{step}$ | Incremental step voltage of MPPT | 0.00025 |
| $k_{pdc}/k_{idc}$ | DC-link controller gains | 500/3 |
| $P_r$ (W) | Power rating of the PV module. | 315 W |
| $V_{mp}$(V) | Voltage at the MPP (Volt) | 57.7 V |
| $I_{mp}$ (A) | Current at the MPP (A) | 5.76 |
| $V_{oc}$ (V) | Open circuit voltage of the PV module | 64.6 V |
| $I_{sc}$ (A) | Short circuit current of the PV module | 6.14 |
| $T_r$ | Rated temperature at STC$^a$ | 25° C. |
| $S_r$ | Rated solar irradiance at STC$^a$ | 1000 W/m$^2$ |

$^a$STC: Standard test conditions.

TABLE II

PV ARRAY PARAMETERS.

| | Value | |
|---|---|---|
| Parameter | $DG_1$ | $DG_2$ |
| Number of parallel strings | 4 | 2 |
| Number of series modules per each for $DG_1$/$DG_2$ | 12 | 12 |

TABLE III

THE SIMULATION SCENARIO APPLIED ON THE CASE STUDY.

| Simulation time(s) | MG Mode | Insolation (W/m$^2$) | Temp. (° C.) | Common Loads (kVA) | MPP of $DG_{1, 2}$ (kW) |
|---|---|---|---|---|---|
| 0.0-2.0 | ISM | 1000 | 25 | 6.0 + 2.0j | No tracking |
| 2.0-4.0 | | 1000 | 25 | 12.0 + 4.0j | |
| 4.0-8.0 | GCM | 1000 | 25 | 0.0 | 15.12/7.53 |
| 8.0-12.0 | | 300 | 25 | 12.0 + 4.0j | 4.43/2.21 |
| 12.0-16.0 | | 800 | 30 | 6.0 + 2.0j | 11.63/5.9 |
| 16.0-20.0 | ISM | 800 | 30 | 12.0 + 4.0j | No tracking |

Comparative simulations are executed to compare the simplified P&O MPPT unit with a conventional P&O MPPT unit. To distinguish the two units in later graphs, the P&O MPPT unit is referred to as MPPT$_{AC}$ and the conventional P&O MPPT unit is referred to as MPPT$_{DC}$. Results show that the P&O MPPT unit precisely tracks the MPP of both PV arrays rated (15 kW) and (7.5 kW), respectively. This is achieved during all times of GCM with both $DG_1$ and $DG_2$ under varied insolation and temperature as depicted in FIG. 22.

Figure 22:
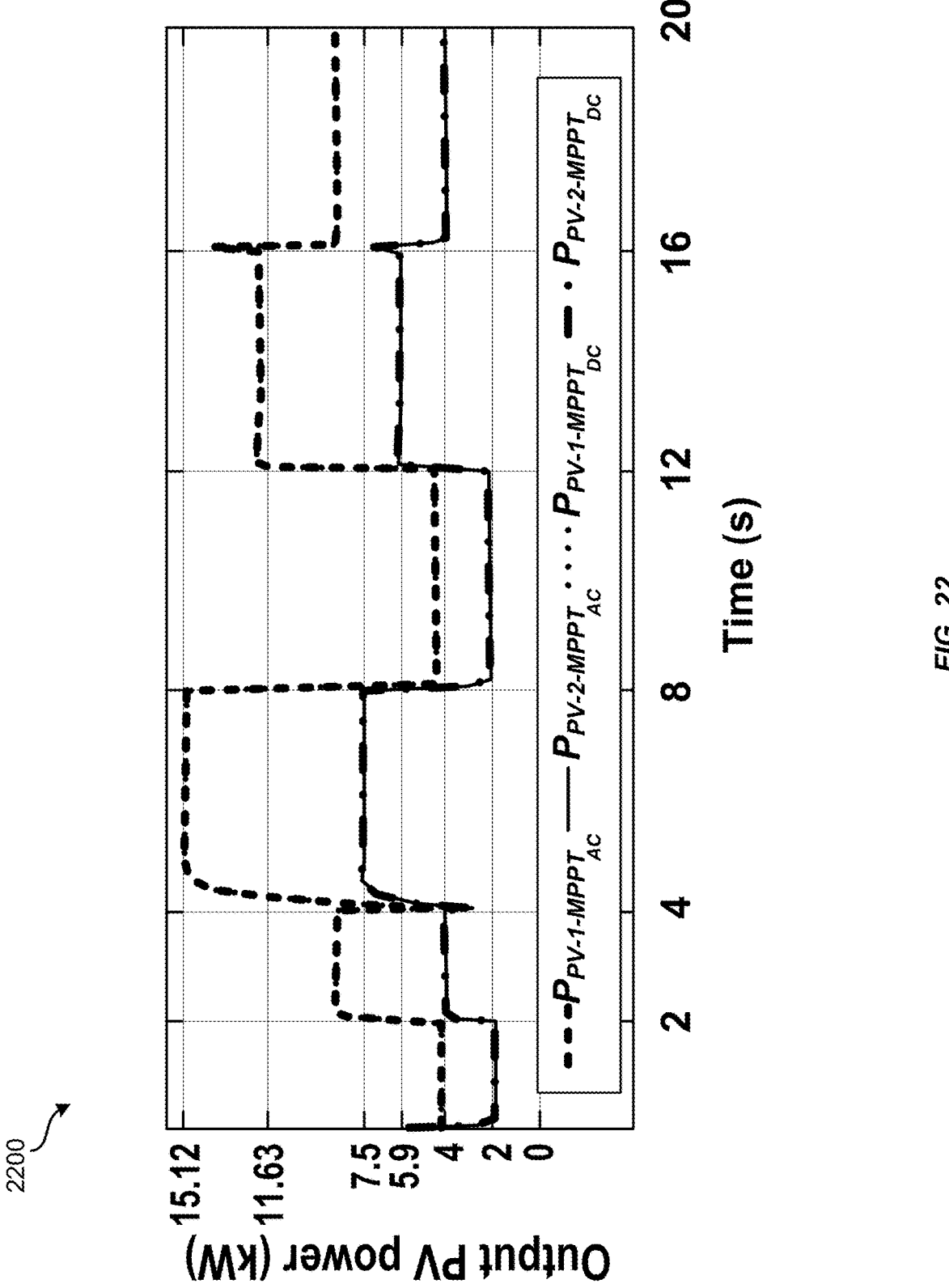
FIG. 22 is a graph showing measured PV output power versus time for two PV arrays using different measurement techniques during a RTS with temperature and irradiance varied according to one example of the present application.

FIG. 22 is a graph showing measured PV output power versus time for two PV arrays using different measurement techniques during a RTS with temperature and irradiance varied according to one example of the present application. PV power is consistent with expected values based on MPP reference values associated with simulation scenarios outlined in Table III. Results of the RTS suggest the P&O MPPT unit can accurately extract maximum available PV power. In addition, the MG controller displays good dynamic response in the RTS, while allowing only insignificant perturbations based on an adopted compromise between P&O sampling rate (10 kHz) and selected incremental voltage steps (0.00025V).

Figure 23:
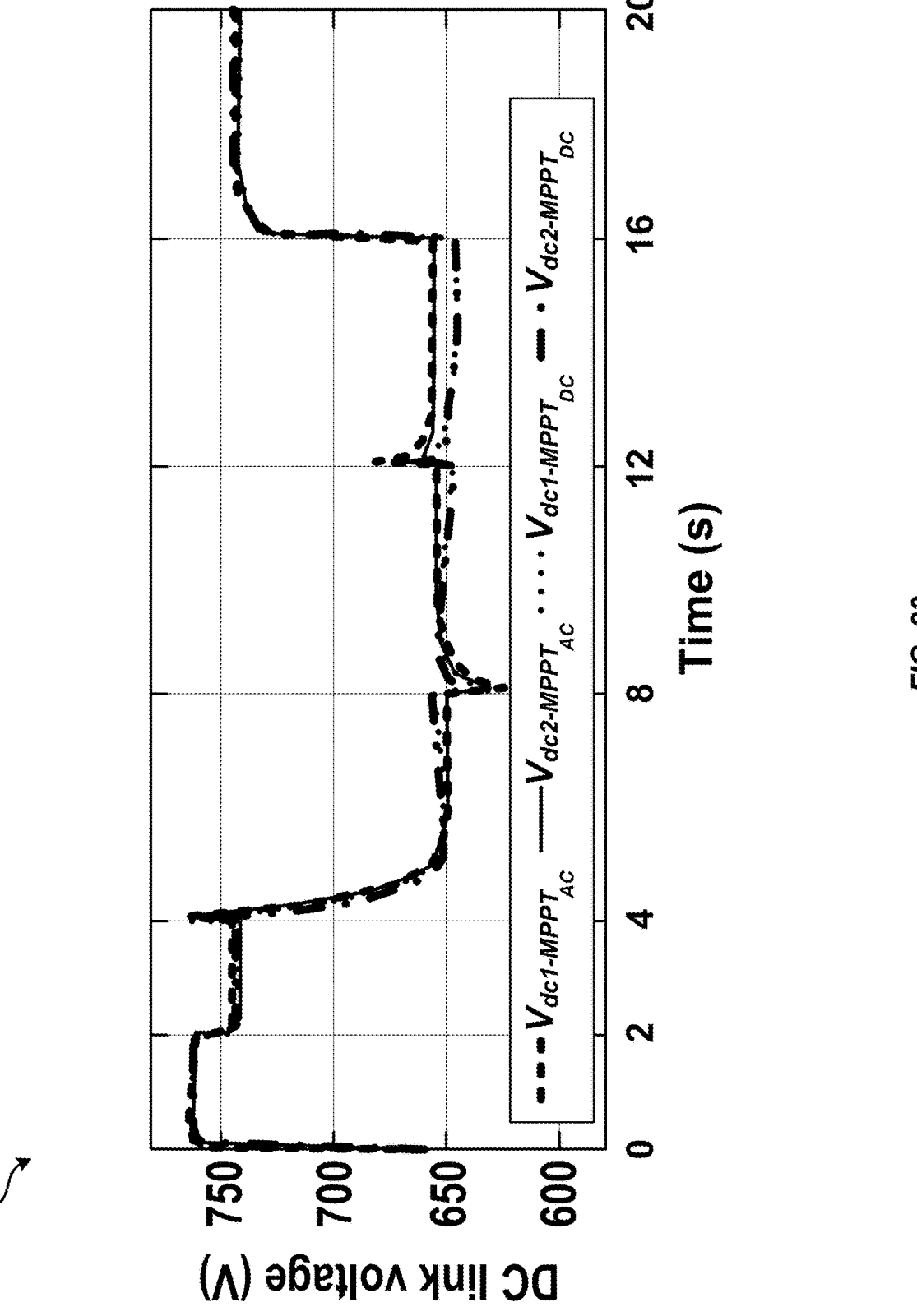
FIG. 23 is a graph of DC-link voltage versus time for two PV arrays using different measurement techniques during a RTS according to one example of the present application.

A DC-link voltage controller regulates voltage $V_{dc}$ in both operating modes, as illustrated in FIG. 23. FIG. 23 is a graph of DC link voltage versus time for two PV arrays using different measurement techniques during a RTS according to one example of the present application. The DC-link voltage is maintained during ISM at 760 and 720 V DC, which matches with a PV operating point that satisfies load demands of 6+2j and 12+4j kVA, respectively. During GCM, a P&O MPPT control system continuously manipulates the reference DC-link voltage $V_{dc\_ref}$ to match varied climatic conditions indicated before in Table III. The DC link voltage again maintains a value of 720 VDC upon sudden switching to ISM. Results indicate a design coupling of the P&O MPPT control system with the DC-link voltage controller can achieve the proper PV operating point at a DC link side. Additionally, the results indicate that a transient response of the DC link voltage regulation is quite fast without noticeable oscillations and/or overshoots.

Figure 24:
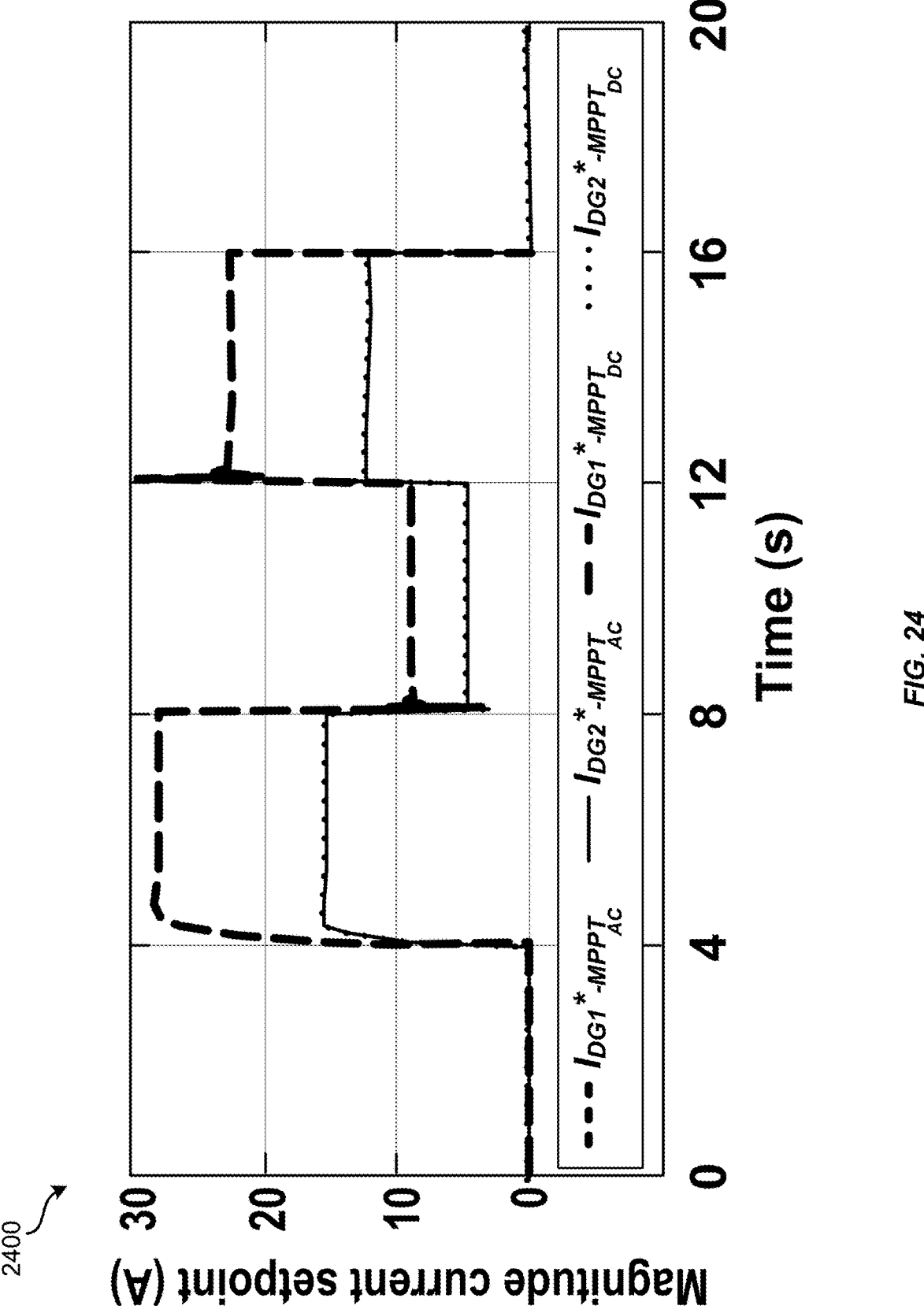
FIG. 24 is a graph of magnitude of AC reference current setpoint versus time using different measurement techniques during a RTS with temperature and irradiance varied according to one example of the present application.

During the RTS, a correspondent magnitude of an AC current reference set point $I_{set}*$ is adaptively varied by the DC-link voltage controller. The adaptive variation of the AC reference set point occurs particularly during GCM within the time period of 4-16 seconds, in compliance with a tracked $V_{mpp}$ due to the irradiation/temperature changes, as shown in FIG. 24. FIG. 24 is a graph of magnitude of the AC reference current setpoint versus time using different measurement techniques during a RTS with temperature and irradiance varied according to one example of the present application.

Meanwhile in ISM, the DC-link voltage controller automatically manipulates $I_{set}$ at zero as shown during time intervals 0-4 and 16-20 seconds. The generated current set point is free of any oscillation, which indicates that the P&O MPPT control system perturbations are mitigated using an adopted small step voltage. The adopted small step voltage has no side impact of system transient response as indicated by the current set point behavior as a function of time. The current set point is simultaneously varied after applied changes by the simulation scenarios mentioned in Table III.

Figure 25:
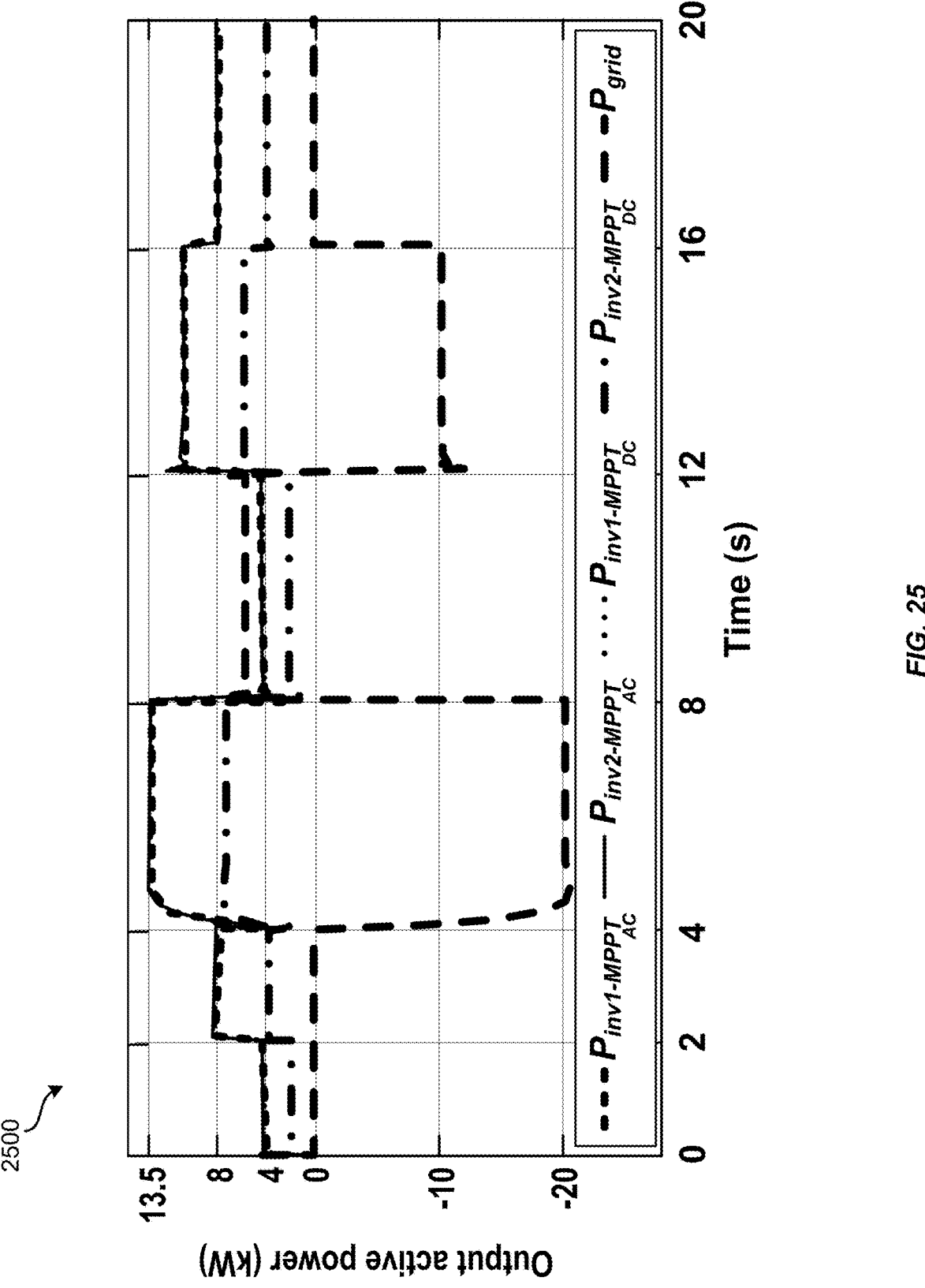
FIG. 25 is a graph of output active power versus time for a main grid and two PV arrays using different measurement techniques during a RTS according to one example of the present application.
Figure 26:
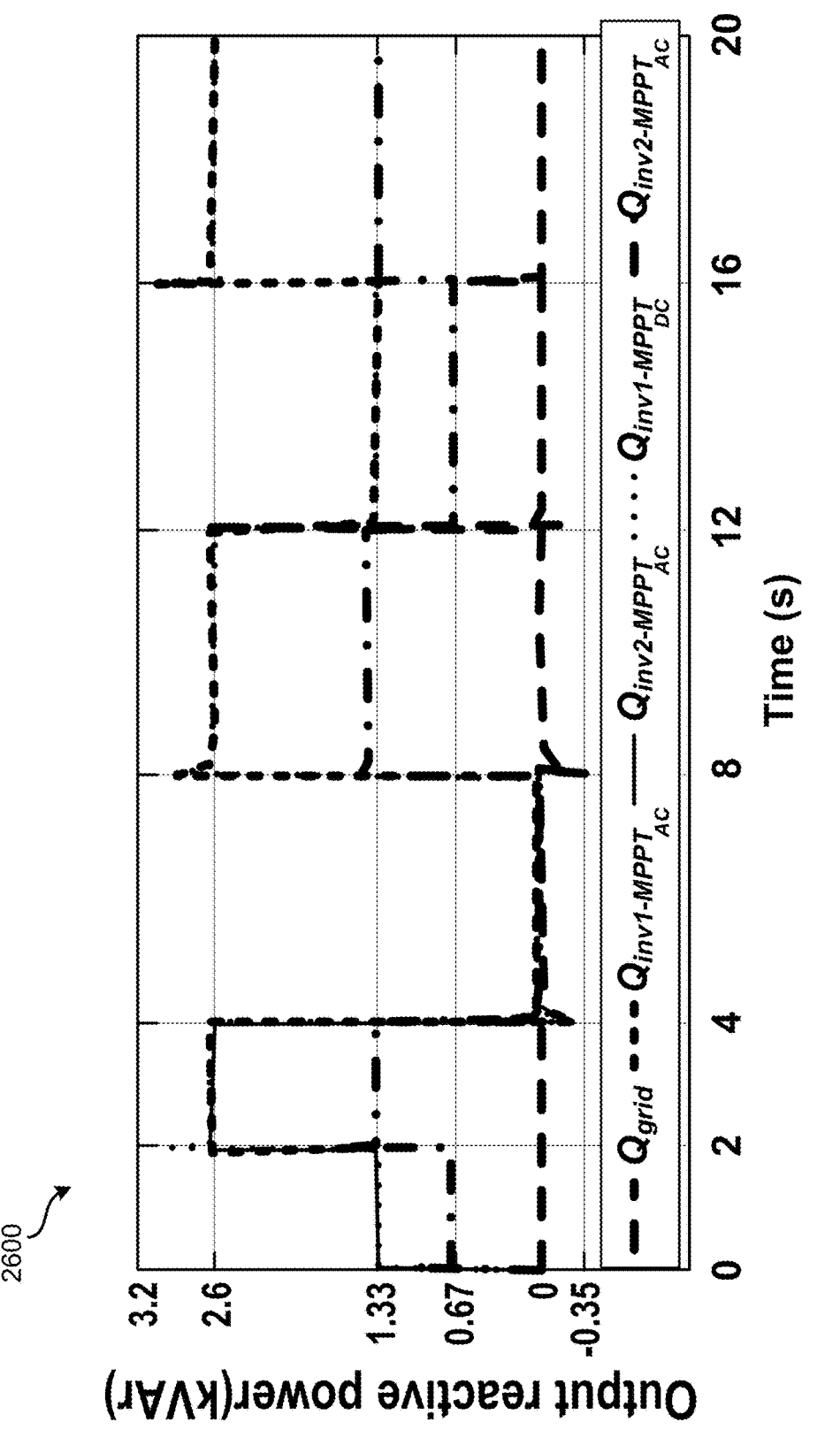
FIG. 26 is a graph of output reactive power versus time for a main grid and two PV arrays using different measurement techniques during a RTS according to one example of the present application.

Prominently, power sharing is addressed in proportion with power ratings of parallel inverters, where a 66%/33% sharing ratio is maintained between $DG_1$ and $DG_2$ for both active and reactive power as shown in FIGS. 25 and 26. FIG. 25 is a graph of output active power versus time for a main grid and two PV arrays using different measurement techniques during a RTS according to one example of the present application. FIG. 26 is a graph of output reactive power versus time for a main grid and two PV arrays using different measurement techniques during the RTS according to one example of the present application. Power sharing accuracy is also maintained during a dual mode of operation without using communication links and despite unknown impedance parameters.

Moreover, in spite of an assumption that tie line impedances at output terminals of $DG_1$ and $DG_2$ are different as outlined in Table I, output active and reactive power sharing accuracy is not affected. Based on FIGS. 25 and 26, a RCDC can accurately share power between DGs even when the DGs have unequal output impedances. Studying reactive power sharing, in particular, the MG controller can accurately share the reactive power without using any virtual impedance or uncertainty estimators in contrast to many complex conventional controllers discussed in the literature.

Additionally, power delivery to the main grid is maintained at unity power factor during GCM.

Figure 27:
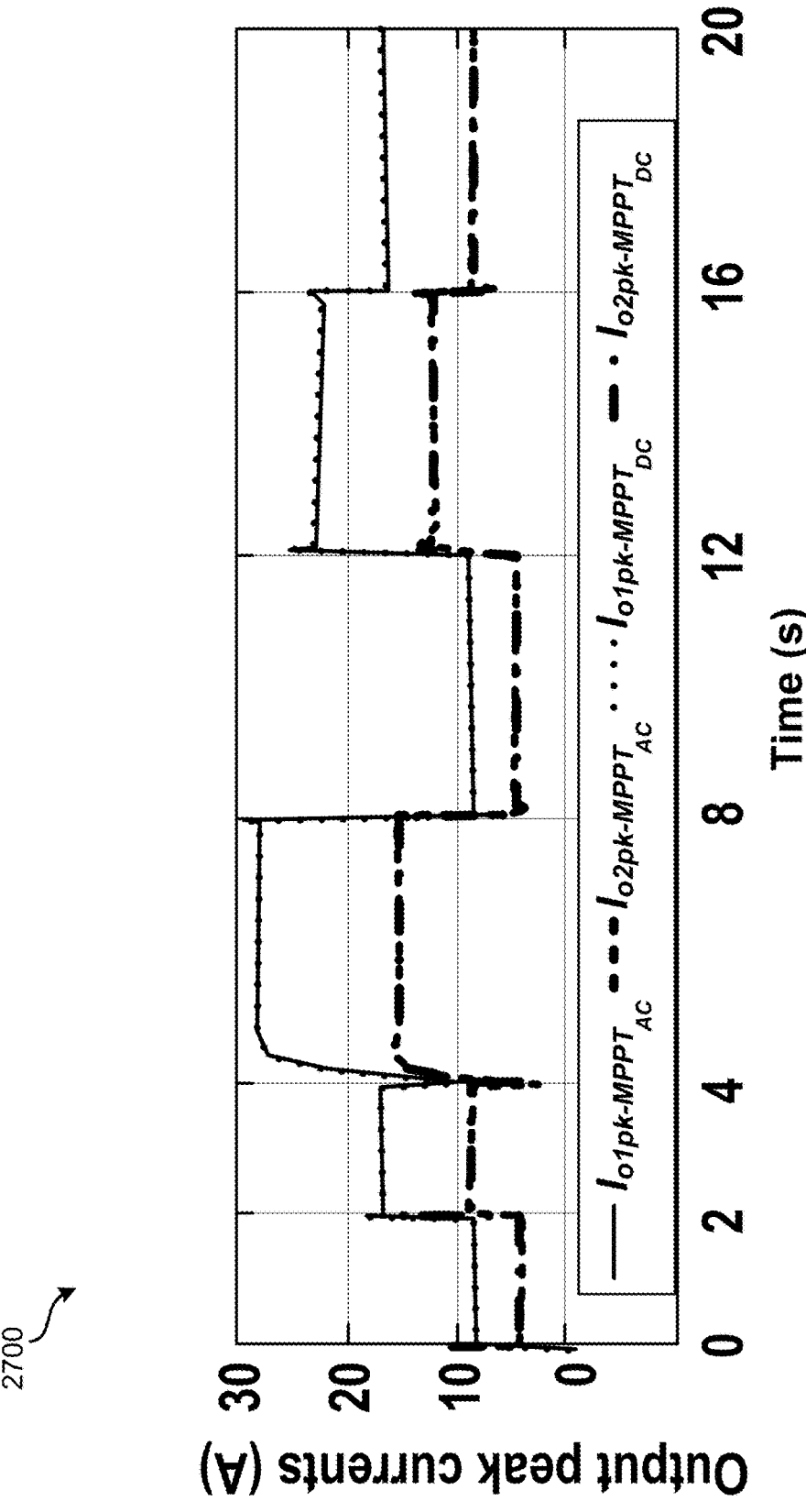
FIG. 27 is a graph of output peak current versus time for two PV arrays using different measurement techniques during a RTS according to one example of the present application.

Similar conclusions can be drawn from FIG. 27, where an output peak current of a three phase system is shared proportionally between parallel inverters without remarkable overshoots. FIG. 27 is a graph of output peak current versus time for two PV arrays using different measurement techniques during a RTS according to one example of the present application. The output peak current is shared proportionally even under transients like double loading during ISM and transient input power variations due to ambient insolation and temperature changes.

Moreover, a seamless transition from ISM to GCM is observed with no considerable overshoots evident in output power curves of FIGS. 25 and 26. However, it can be noticed that a slight difference exists between extracted PV power $(P_{Pv1-2})$ as shown in FIG. 22 and inverters' output power $(P_{inv1,2})$ as shown in FIG. 25. This discrepancy can be traced back to power losses across an output LC filter and an impedance line, in addition to switching losses. The MG controller can be freely designed without regards to MG operating mode due to a unified current controlled architecture. Minimal overshoots occur during switching from ISM to GCM, indicating a seamless transition. In addition, the MG controller efficiently maintains a tracking process for MPP using the P&O MPPT control system in conjunction with a modified RCDC.

Figure 28:
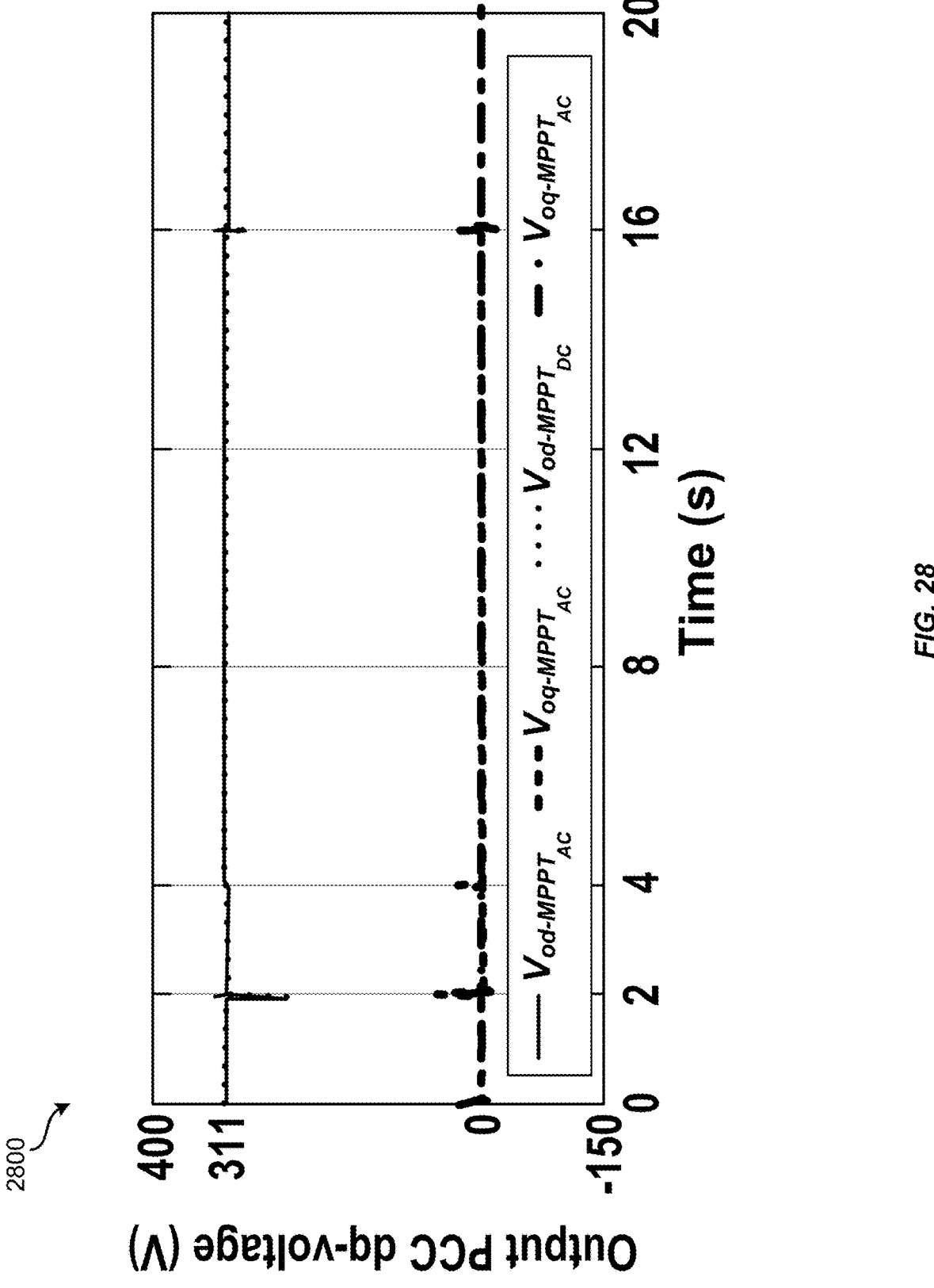
FIG. 28 is a graph of output direct axis voltage and output quadrature axis voltage at a PCC versus time using different measurement techniques during a RTS according to one example of the present application.

FIG. 28 is a graph of output direct axis voltage and output quadrature axis voltage at a PCC versus time using different measurement techniques during a RTS according to one example of the present application. As shown in FIG. 28, the output direct $(V_{od})$ and the quadrature $(V_{oq})$ axes voltages at the PCC are regulated. An output direct axis voltage magnitude is maintained at a nominal value (311 peak voltage) while an output quadrature axis voltage magnitude is regulated to remain at zero implying phase balancing in the system. The two PCC output axes voltages are maintained with less than 5% deviation from the nominal voltage values in compliance with IEEE 519. The two nearly constant values indicate a robust voltage regulation supported by the MG controller.

Output peak currents of two parallel inverters illustrated in FIG. 27 completely match the reference AC current set point, which is identified by the P&O MPPT control system, depicted before in FIG. 24. No considerable overshoots exist upon various conditions, e.g., transient load variations either during ISM or GCM, the climatic weather changes including insolation and temperature changes, and switching events of the MG operating mode. The MG controller with a unified current control architecture can effectively operate in an MG under miscellaneous transient conditions.

To summarize, results of the RTC show that the P&O MPPT control unit of the MG controller, which can track the MPP based on an AC current measurement, achieves results that are similar to results of a conventional P&O algorithm that uses additional DC sensing elements, implying that simplifications within the P&O MPPT control system do not compromise system performance. Results of FIGS. 23, 25, 26, and 27 verify that design of the P&O MPPT control system can be freely built without regards to operating mode by taking an advantage of a unique aspect of the MG controller. The unique aspect of the MG controller is an acceptance of any current set-point (from 0 to $I_{rated}$) while satisfying a proportionally shared load during ISM. Hence, upon switching from GCM, an islanded operation can be seamlessly managed simply by using a last current set-point identified by the P&O MPPT control system. In contrast, MPPT systems of conventional VCM based droop controllers may need to identify or adjust the current set-point to zero during ISM.

Additionally, transient mitigation strategies upon altering a control mode of the MG controller between VCM and CCM subsequent to MG operational changes are no longer required owing to a unified current control architecture. In addition, a simulation time of the RTC has been successfully increased above 2.5 seconds in real time without noticing any further resonance issues thanks to a removal of a predictive current scaling $V_{ratio}$.

Figure 29:
FIG. 29 is a graph of output phase voltage at a PCC and main grid voltage versus time for a phase shift of 120° according to one example of the present application.
Figure 30:
FIG. 30 is a graph of output phase voltage at a PCC and main grid voltage versus time for a phase shift of −90° according to one example of the present application.

Furthermore, the PLL-less SSM unit has been tested separately from the simulation scenario, as depicted in FIGS. 29 and 30. FIGS. 29 and 30 show that inverters can automatically synchronize with the main grid under different leading/lagging phase shifts, namely 120° and –90°. FIG. 29 is a graph of output phase voltage at a PCC and main grid voltage versus time for a phase shift of 120° according to one example of the present application. FIG. 30 is a graph of output phase voltage at the PCC and main grid voltage versus time for a phase shift of –90° according to one example of the present application. Both graphs indicate that a PLL-less SSM init can yield a quick response and synchronize with the main grid within three fundamental cycles or less.

Figure 31:
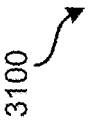
FIG. 31 is a graph of insolation versus time showing rapidly changing insolation levels in a more stringent RTS scenario according to one example of the present application.
Figure 32:
FIG. 32 is a graph of temperature versus time for a more stringent RTS scenario according to one example of the present application.

To explore additional verifications of control efficacy and robustness of a MG controller under rapidly changing insolation and temperature levels with wide variations, a more stringent simulation scenario in GCM is followed, as described by Table IV, FIG. 31, and FIG. 32. FIG. 31 is a graph of insolation versus time showing rapidly changing insolation levels in a more stringent RTS scenario according to one example of the present application. FIG. 32 is a graph of temperature versus time for the more stringent RTS scenario according to one example of the present application. The more stringent RTs scenario is run with an assumption that interconnected common loads are (6+2j kVA).

Figure 33:
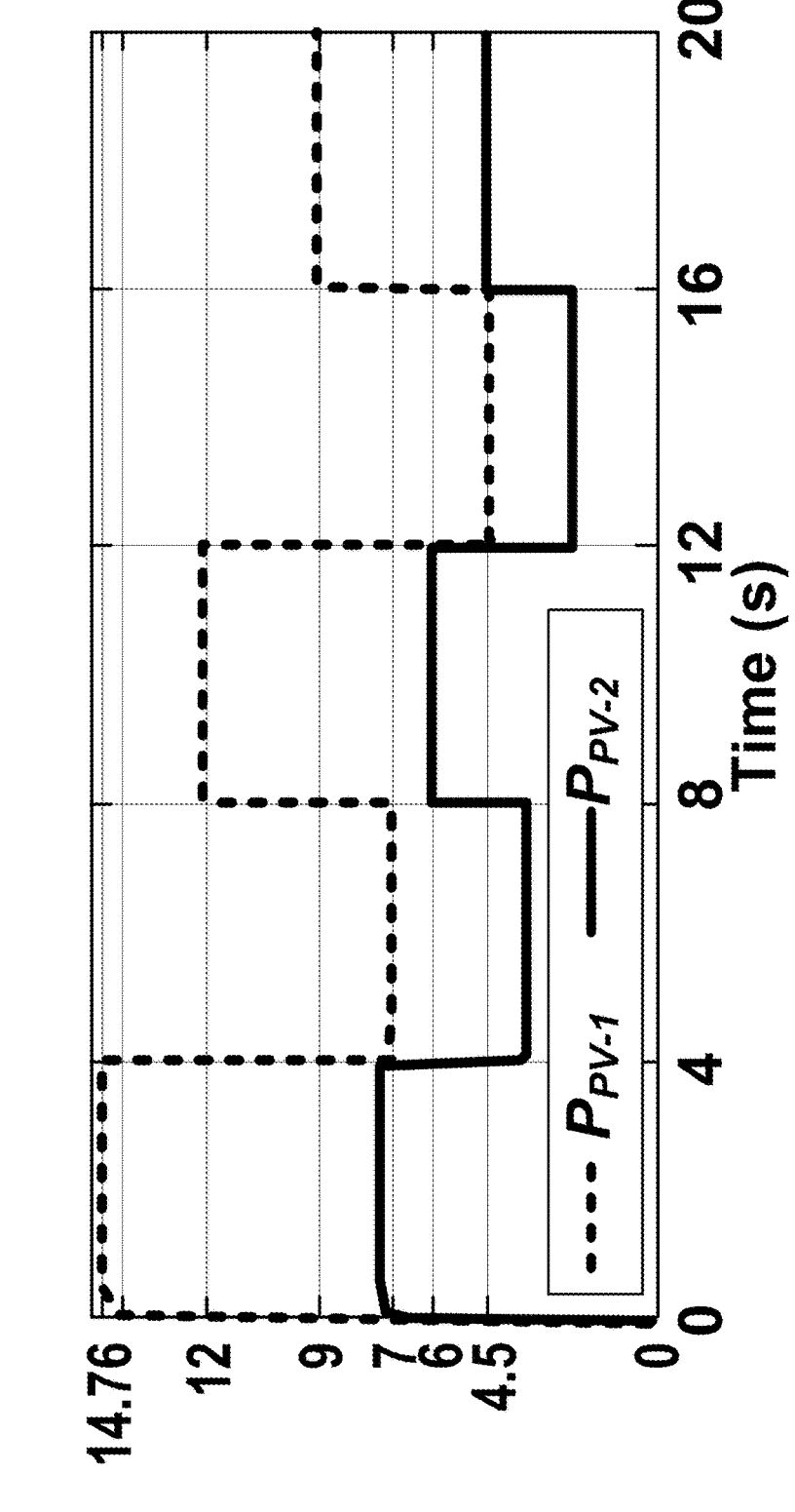
FIG. 33 is a graph of output power versus time for two PV arrays under a more stringent RTS scenario with varying insolation and temperature according to one example of the present application.

FIG. 33 is a graph of output power versus time for two PV arrays under a more stringent RTS scenario with varying insolation and temperature according to one example of the present application. Based on a time dependence of the output power shown in the graph of FIG. 33, a P&O MPPT control system can precisely track a MPP of both PV arrays rated (15 kW) and (7.5 kW), respectively, matching with reference values outlined in Table IV. Thus, a tracking accuracy of the P&O MPPT control system may not be compromised even under stringent insolation temperature changes, and perturbations in output voltage curves can be kept to a minimum.

Figure 34:
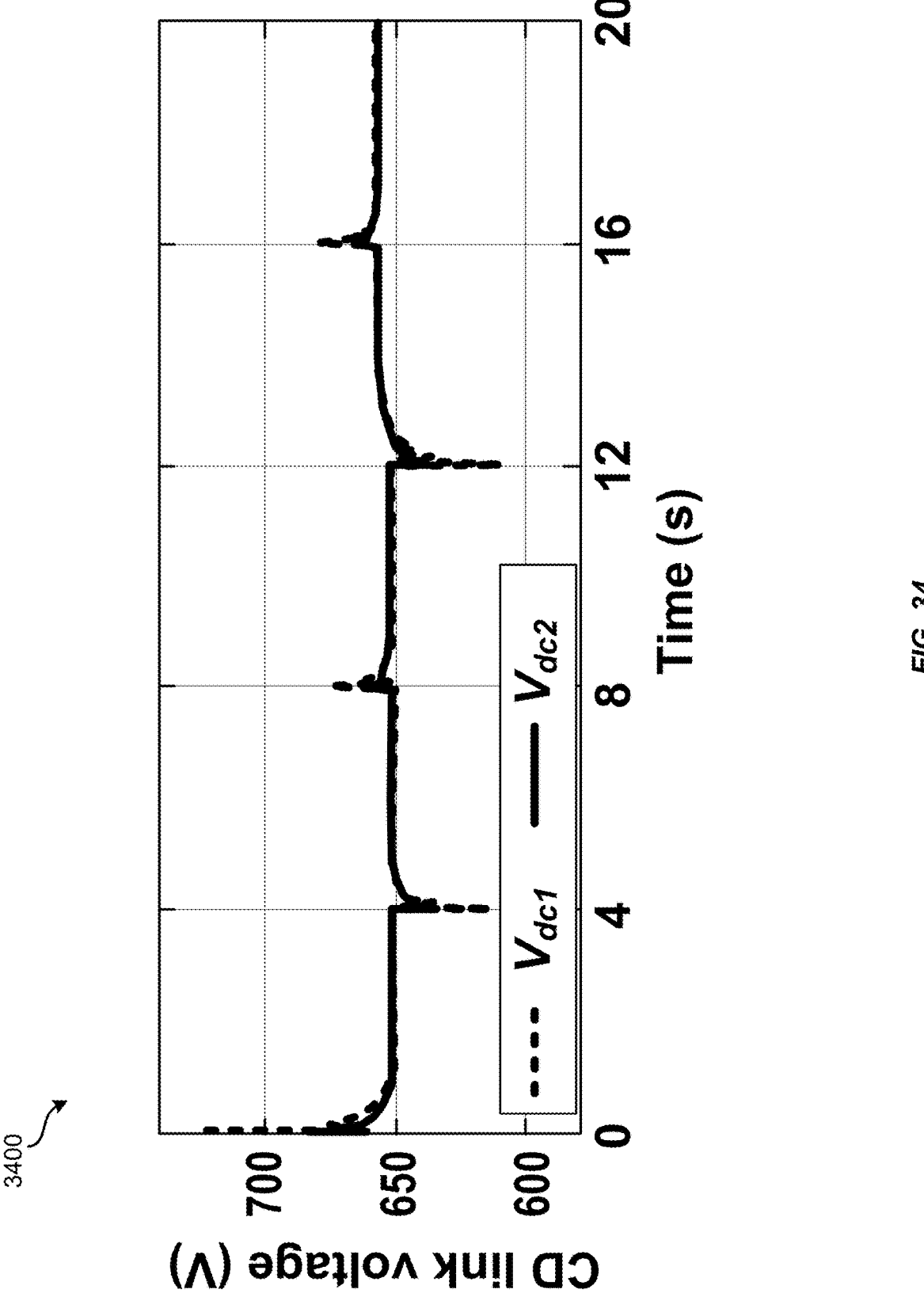
FIG. 34 is a graph of DC-link voltage versus time for two PV arrays under a more stringent RTS scenario with varying insolation and temperature according to one example of the present application.
Figure 35:
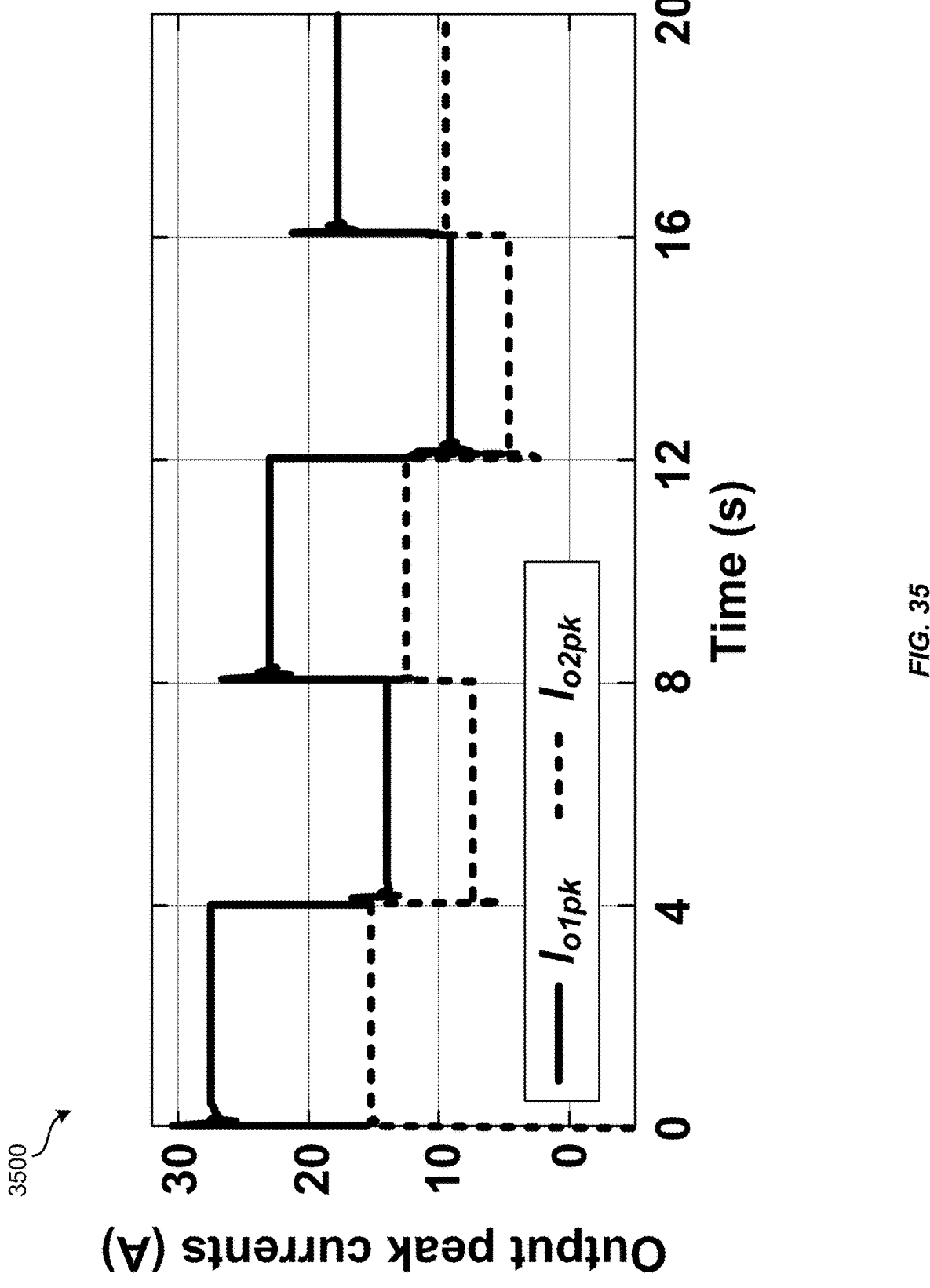
FIG. 35 is a graph of output peak current versus time for two PV arrays under a more stringent RTS scenario with varying insolation and temperature according to one example of the present application.

FIG. 34 is a graph of DC-link voltage versus time for two PV arrays under a more stringent RTS scenario with varying insolation and temperature according to one example of the present application. The DC-link voltage $V_{dc}$ is maintained as illustrated in FIG. 34 showing that a proposed P&O MPPT control system can efficiently manipulate a reference DC-link voltage $V_{dc\_ref}$ in compliance with varied climatic conditions given in Table IV. Moreover, a transient response of a DC-link voltage controller can be quite fast with negligible oscillations and/or overshoots. Similar results are shown for a graph of output peak current, which is shared proportionally between parallel inverters. FIG. 35 is a graph of output peak current versus time for two PV arrays under the more stringent RTS scenario with varying insolation and temperature according to one example of the present application. The graph in FIG. 35 does not show remarkable overshoots in the output peak currents even under transients of input power variations resulting from insolation and temperature changes. Summarizing, results from the more stringent RTS scenario displays the control flexibility of the MG controller, validating an effectiveness of the MG controller in tracking MPP under varied solar insolation levels and varied ambient temperatures.

TABLE IV

| STRINGENT SCENARIO FOR SOLAR AND TEMPERATURE VARIATIONS | | | | | |
|---|---|---|---|---|---|
| Simulation time(s) | MG Mode | Insolation (W/m²) | Temp. (° C.) | Common Loads (kW) | MPP of $DG_{1,2}$ (kW) |
| 0.0-4.0 | GCM | 1000 | 32 | 6.0 + 2.0j | 14.76/7.38 |
| 4.0-8.0 | | 500 | 38 | | 7/3.5 |
| 8.0-12.0 | | 800 | 27 | | 12/6 |
| 12.0-16.0 | | 300 | 22 | | 4.5/2.25 |
| 16.0 -20.0 | | 600 | 25 | | 9.04/4.52 |

In the preceding description, various embodiments have been described. For purposes of explanation, specific configurations and details have been set forth to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A microgrid (MG) controller for a plurality of distributed generators (DGs) of photovoltaic (PV) arrays, the MG controller comprising:
   a power sharing unit configured to share power proportionally in a single current controlled mode (CCM) between the plurality of DGs based on a power capacity for each DG of the plurality of DGs, the power sharing unit comprising:
      a robust current droop controller (RCDC) configured to provide proportional active current shared between the plurality of DGs; and
      a quasi-proportional resonant (QPR) regulator coupled to the RCDC within a unified architecture, the QPR regulator configured to regulate a reference current signal; and
   a DC-link voltage regulation unit comprising:
      a perturb and observe (P&O) Maximum solar Power Point Tracking (MPPT) control system configured to extract a maximum solar power point (MPP) for at least one of the PV arrays, wherein the P&O MPPT control system is further configured to extract the MPP based on an AC current measurement by a current sensor with a first power rating that is less than a second power rating for a PV inverter associated with the PV arrays; and
      a DC-link voltage controller configured to regulate, based on the MPP, an output voltage for at least one of the PV arrays using a current setpoint.

2. The MG controller of claim 1, wherein the power sharing unit is further configured to support dual modes of operation comprising a Grid Connected Mode (GCM) and an Islanded Mode (ISM).

3. The MG controller of claim 1, wherein the DC-link voltage controller is further configured to accept a last current setpoint identified as the current setpoint upon switching from GCM to ISM.

4. The MG controller of claim 1, wherein the P&O MPPT control system is further configured to extract the MPP under varied insolation and temperature levels.

5. The MG controller of claim 1, further comprising:
   a phase locked loop (PLL)-less frequency detector configured to obtain a reference frequency from an output current measurement; and
   a PLL-less self-synchronization mechanism (SSM) unit configured to perform, based on the reference frequency, active synchronization with a main grid.

6. The MG controller of claim 5, wherein the PLL-less SSM unit is further configured to achieve synchronization with the main grid within less than three fundamental cycles.

7. A microgrid (MG) controller for a plurality of distributed generators (DGs) of Renewable Energy Sources (RESs), the MG controller comprising:
   a power sharing unit configured to share power proportionally in a single current controlled mode (CCM) between the plurality of DGs based on a power capacity for each DG of the plurality of DGs, the power sharing unit comprising:

a robust current droop controller (RCDC) configured to provide proportional active current shared between the plurality of DGs; and
      a quasi-proportional resonant (QPR) regulator coupled to the RCDC within a unified architecture, the QPR regulator configured to regulate a reference current signal; and
   a DC-link voltage regulation unit comprising:
      a perturb and observe (P&O) Maximum solar Power Point Tracking (MPPT) control system configured to extract a maximum solar power point (MPP) for at least one photovoltaic (PV) array of PV arrays, wherein the P&O MPPT control system is further configured to extract the MPP based on an AC current measurement by a current sensor with a first power rating that is less than a second power rating for a PV inverter associated with the PV arrays; and
      a DC-link voltage controller configured to regulate, based on the MPP, an output voltage for at least one of the PV arrays using a current setpoint.

8. The MG controller of claim 7, wherein the power sharing unit is further configured to support dual modes of operation comprising a Grid Connected Mode (GCM) and an Islanded Mode (ISM).

9. The MG controller of claim 7, further comprising:
   a phase locked loop (PLL)-less frequency detector configured to obtain a reference frequency from an output current measurement; and
   a PLL-less self-synchronization mechanism (SSM) unit configured to perform, based on the reference frequency, active synchronization with a main grid.

10. The MG controller of claim 9, wherein the PLL-less SSM unit is further configured to achieve synchronization with the main grid within less than three fundamental cycles.

11. A method for controlling a microgrid of a plurality of distributed generators (DGs) of photovoltaic (PV) arrays, the method comprising:
   sharing power proportionally in a single current controlled mode (CCM) between the plurality of DGs based on a power capacity for each DG of the plurality of DGs, sharing the power proportionally comprises:
      regulating a reference current signal with a quasi-proportional resonant (QPR) regulator within a unified architecture with a robust current droop controller (RCDC); and
      providing, based on the reference current signal, a proportional active current shared between the plurality of DGs;
   extracting, using a perturb and observe (P&O) Maximum solar Power Point Tracking (MPPT) control system of a DC-link voltage regulation unit, a maximum solar power point (MPP) for at least one of the PV arrays based on an AC current measurement by a current sensor with a first power rating that is less than a second power rating for a PV inverter associated with the PV arrays; and
   regulating, based on the MPP, an output voltage for at least one of the PV arrays using a current setpoint.

12. The method of claim 11, wherein sharing the power proportionally in the single CCM is maintained in dual modes of operation comprising a Grid Connected Mode (GCM) and an Islanded Mode (ISM).

13. The method of claim 11, further comprising accepting a last current setpoint identified as the current setpoint upon switching from GCM to ISM.

14. The method of claim 11, wherein extracting the MPP is performed under varied insolation and temperature.

15. The method of claim 11, further comprising:

obtaining a reference frequency from an output current measurement; and performing, based on the reference frequency, active synchronization with a main grid.

* * * * *